(12) United States Patent
Sun et al.

(10) Patent No.: US 11,825,034 B2
(45) Date of Patent: Nov. 21, 2023

(54) BULLET SCREEN DELIVERY METHOD FOR LIVE BROADCAST PLAYBACK AND LIVE VIDEO BULLET SCREEN PLAYBACK METHOD

(71) Applicant: SHANGHAI BILIBILI TECHNOLOGY CO., LTD., Shanghai (CN)

(72) Inventors: Shuai Sun, Shanghai (CN); Xian Lin, Shanghai (CN); Jin Hou, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 30 days.

(21) Appl. No.: 17/488,068

(22) Filed: Sep. 28, 2021

(65) Prior Publication Data

US 2022/0103904 A1    Mar. 31, 2022

(30) Foreign Application Priority Data

Sep. 29, 2020 (CN) .......................... 202011051417.2

(51) Int. Cl.
*H04N 21/4725* (2011.01)
*H04N 21/472* (2011.01)
(Continued)

(52) U.S. Cl.
CPC ... *H04N 21/4725* (2013.01); *H04N 21/47205* (2013.01); *H04N 21/47217* (2013.01);
(Continued)

(58) Field of Classification Search
CPC ......... H04N 21/4725; H04N 21/47205; H04N 21/47217; H04N 21/43074;
(Continued)

(56) References Cited

U.S. PATENT DOCUMENTS

2021/0127171 A1*  4/2021  Liu .................. G06F 3/0488
2021/0127178 A1*  4/2021  Zhang ............. G06Q 30/0251
2022/0417619 A1*  12/2022  Lu .................. H04L 43/106

FOREIGN PATENT DOCUMENTS

| CN | 105245960 A | 1/2016 |
| CN | 110198493 A | 9/2019 |
| CN | 111526374 A | 8/2020 |

OTHER PUBLICATIONS

Xu Yang et al., ("Natural Language Processing in "Bullet Screen" Application" Published Jul. 2017—International Conference . . . (total 6 pages) (Year: 2017).*

* cited by examiner

*Primary Examiner* — Quoc A Tran
(74) *Attorney, Agent, or Firm* — BakerHostetler

(57) ABSTRACT

The present application provides techniques of presenting bullet screens for live broadcast playback. The techniques comprise receiving a request for bullet screens sent from a client computing device during playback of at least one portion of a live broadcast video, wherein the bullet screens comprise comments moving across frames of the live broadcast video, the request comprises a timestamp, and the timestamp is associated with a playback progress of the at least one portion of the live broadcast video; determining a bullet screen segment file among a plurality of bullet screen segment files based on the timestamp, wherein the plurality of bullet screen segment files are generated by segmenting live bullet screen data associated with the live broadcast video into N bullet screen segment files, and the N is a positive integer; and transmitting the bullet screen segment file to the client computing device for display of the bullet screens.

20 Claims, 17 Drawing Sheets

(51) Int. Cl.
   *H04N 21/431*      (2011.01)
   *H04N 21/2187*     (2011.01)
   *H04N 21/235*      (2011.01)
   *H04N 21/845*      (2011.01)
   *H04N 21/4788*     (2011.01)
   *H04N 21/488*      (2011.01)
   *H04N 21/6587*     (2011.01)
   *H04N 21/8547*     (2011.01)
   *H04N 21/4722*     (2011.01)
   *H04N 21/43*       (2011.01)
   *G06F 17/00*       (2019.01)

(52) U.S. Cl.
   CPC ....... *H04N 21/2187* (2013.01); *H04N 21/235* (2013.01); *H04N 21/4316* (2013.01); *H04N 21/43074* (2020.08); *H04N 21/4722* (2013.01); *H04N 21/4788* (2013.01); *H04N 21/488* (2013.01); *H04N 21/6587* (2013.01); *H04N 21/8456* (2013.01); *H04N 21/8547* (2013.01)

(58) Field of Classification Search
   CPC ........... H04N 21/4316; H04N 21/6587; H04N 21/8456; H04N 21/8547; H04N 21/4722; H04N 21/2187; H04N 21/235; H04N 21/433; H04N 21/4788; H04N 21/488
   See application file for complete search history.

interaction anchor contribution big voyage(61) like anchor notice 9-1 update normal live broadcast today video 380   news   live playback 67 yesterday extreme hunting 2V4

昨天 19:04-23:28

4780 bullet screens

Earlier extreme hunting with God of War 2V4

09-16 21:06-22:21

917 bullet screens extreme hunting with God of War 2V4

09-16 18:24-21:08

BULLET SCREEN DELIVERY METHOD FOR LIVE BROADCAST PLAYBACK AND LIVE VIDEO BULLET SCREEN PLAYBACK METHOD

CROSS-REFERENCE TO RELATED APPLICATION

The present application claims priority of Chinese patent application filed on Sep. 29, 2020, with an application number CN202011051417.2 and a name "bullet screen delivery method for live broadcast playback and live video bullet screen playback method". The entire content of the above-identified application is incorporated in the present application by reference.

BACKGROUND

With the rapid development of live video technology, more and more users can watch various live video programs through the Internet. However, due to the particularity of live broadcast, users cannot review missed video clips during a live video process, and can only watch the missed video clips in a form of live broadcast playback through a recorded live video after the live video ends.

SUMMARY

While watching live video programs, users can interact with the anchor and other users via bullet screens. The bullet screen is a subtitle that pops up and moves across frames of a live broadcast video in a certain direction when watching the video through the network, and is a kind of pure communication information. Bullet screen has no fixed vocabulary in English, and it is usually called: comment, danmaku, barrage, bullet screen, bullet-screen comment, etc. Bullet screen allows users to post comments or thoughts, but different from ordinary video sharing sites that only display in a dedicated comment area of the player, bullet screens will appear on the video screen in real time in a form of sliding subtitles to ensure that all viewers can notice.

Currently, live broadcast playback generally binds all text bullet screens during an entire live broadcast process to the time axis of the recorded live video, so as to realize watching live bullet screen during live broadcast playback. However, through the live broadcast playback method, although the live video content may be watched by users again, text bullet screens sent by everyone can only be watched in the corresponding time axis of the recorded live video, which cannot completely restore the bullet screens of the live broadcast scene at that time, and the user's sense of immersion is poor. And binding all text bullet screens to the recorded live video process at the same time will occupy a large amount of memory, which may cause the live broadcast playback to be stuck and not fluent. Therefore, how to reduce the memory consumption of the live bullet screen when the user is playing back the live video has become one of the current technical problems to be solved.

The purpose of the embodiment of the present application is to provide a bullet screen delivery method for live broadcast playback, system, device, computer-readable storage medium, and a live video bullet screen playback method, which is used to solve technical problems such as a large amount of memory occupied by live bullet screens when a user is playing back a live video.

One aspect of the embodiment of the present application provides techniques of delivering bullet screens for live broadcast playback, applied to a server, the techniques comprise receiving a request for bullet screens sent from a client computing device during playback of at least one portion of a live broadcast video, wherein the bullet screens comprise comments moving across frames of the live broadcast video, the request comprises a timestamp, and the timestamp is associated with a playback progress of the at least one portion of the live broadcast video; determining a bullet screen segment file among a plurality of bullet screen segment files based on the timestamp, wherein the plurality of bullet screen segment files are generated by segmenting live bullet screen data associated with the live broadcast video into N bullet screen segment files, and the N is a positive integer; and transmitting the bullet screen segment file to the client computing device for display of the bullet screens.

Another aspect of the embodiment of the present application provides techniques for a live video bullet screen playback, applied to a client, the techniques comprise sending a request for bullet screens to a server computing device during playback of at least one portion of a live broadcast video, wherein the bullet screens comprise comments moving across frames of the live broadcast video, the request comprises a timestamp, and the timestamp is associated with a playback progress of the at least one portion of the live broadcast video; receiving a bullet screen segment file among a plurality of bullet screen segment files, wherein the bullet screen segment file is determined based on the timestamp, the plurality of bullet screen segment files are generated by segmenting live bullet screen data associated with the live broadcast video into N bullet screen segment files, and the N is a positive integer; loading the bullet screen segment file into a memory; reading the bullet screen segment file from the memory; and displaying the bullet screens in a bullet screen display area based on the bullet screen segment file.

The bullet screen delivery techniques for live broadcast playback provided by the embodiments of the present application realize reproduction of user behavior data (various types of bullet screen data) during a live broadcast by segmenting the live bullet screen data corresponding to the target live playback video and delivering the bullet screen segment file to the client in a way of segmentation, and a memory occupation rate of bullet screen data is reduced, and a playback fluency of the live bullet screens is improved.

DETAILED DESCRIPTION OF ILLUSTRATIVE EMBODIMENTS

To make the objectives, technical solutions, and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

It should be noted that the description of "first", "second" and the like in the present application is used for the purpose of description only, and cannot be construed as indicating or implying its relative importance or implicitly indicating the number of the indicated technical features. Thus, features defining "first" or "second" may include at least one of the features, either explicitly or implicitly. In addition, the technical solutions in the embodiments can be combined with each other, but must be based on the realization of those ordinary skilled in the art, when the combinations of the technical solutions are contradictory or unrealizable, it shall be deemed that the combinations of the technical solutions do not exist and are not within the protection scope required by the present application.

Figure 1:
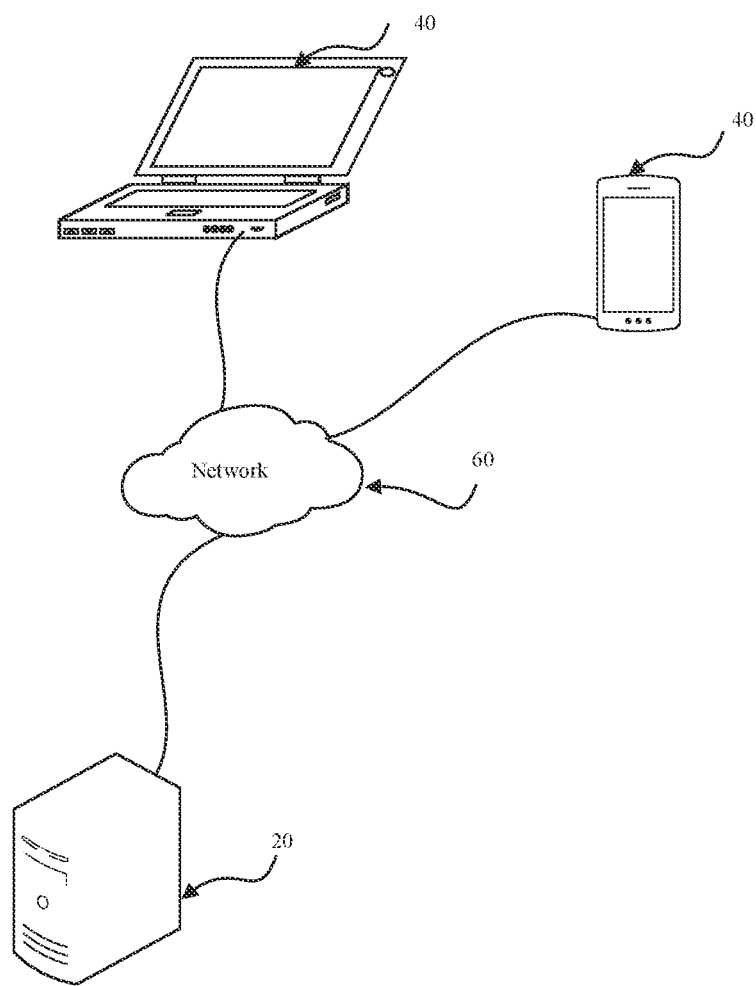
FIG. 1 schematically shows an application environment diagram according to an embodiment of the present application.

FIG. 1 schematically shows an application environment diagram according to an embodiment of the present application. The application environment diagram comprises at least one server 20 and at least one client 40.

The server 20 is configured to instruct the client 40 to generate a live playback request according to a live playback instruction input by a user or generate a bullet screen pull request according to a playback progress, and is configured to obtain a bullet screen segment file corresponding to a live broadcast playback request from a database according to the live broadcast playback request or the bullet screen pull request sent by the client 40, and send the bullet screen segment file to the client 40. The server 20 may be a single server or a server cluster.

The client 40 is configured to generate a live playback request according to a live playback instruction input by a user or generate a bullet screen pull request according to a playback progress, and is configured to parse the bullet screen segment file returned by the server 20 according to the live playback request or the bullet screen pull request, and send a parsed bullet screen segment file to a player for bullet screen display. The client 40 may be a computer device such as a mobile phone, a tablet personal computer, a laptop computer, or a workstation.

The client 40 can establish a network connection with the server 20 through a network 60. The server 20 may be located in a data center such as a single location, or distributed in different physical locations (for example, in multiple locations). The server 20 may provide services via one or more networks 60. The network 60 includes various network devices, such as routers, switches, multiplexers, hubs, modems, bridges, repeaters, firewalls, proxy devices, and/or the like. The network 60 may include physical links, such as coaxial cable links, twisted pair cable links, optical fiber links, combinations thereof, and the like. The network 60 may include wireless links, such as cellular links, satellite links, Wi-Fi links, and the like.

Hereinafter, several embodiments will be used to describe the process of transferring bullet screen segment files between the client 40 and the server 20.

Embodiment 1

Figure 2:
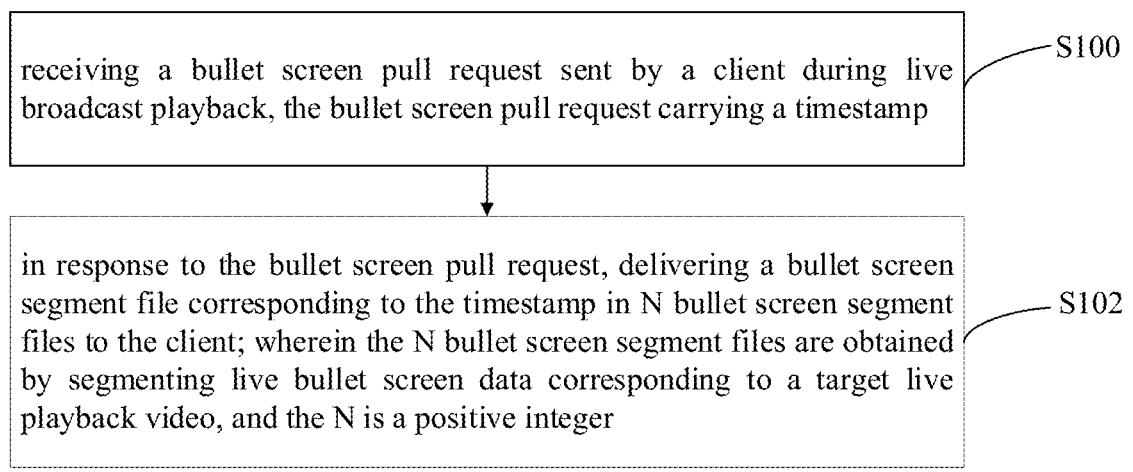
FIG. 2 schematically shows a flowchart of a bullet screen delivery method for live broadcast playback according to a first embodiment of the present application.

FIG. 2 schematically shows a flowchart of a bullet screen delivery method for live broadcast playback according to a first embodiment of the present application. The embodiment can be executed in a computer device (for example, the server 20 in FIG. 1). It can be understood that the flowchart in the embodiment of the method is not used to limit the order of execution of the steps.

As shown in FIG. 2, the bullet screen delivery method for live broadcast playback may comprise steps S100 to S102, wherein:

Step S100, receiving a bullet screen pull request sent by a client during live broadcast playback, wherein the bullet screen pull request carries a timestamp.

The bullet screen playback request is a bullet screen playback request received from the client 40 after a communication connection between the server 20 and the client 40 is established. The bullet screen playback request may request a piece of bullet screen data for use by the client 20.

The timestamp corresponds to a point on a time axis of a target live playback video, and different bullet screen pull requests carry different timestamps.

The bullet screen pull request may also include a target bullet screen playback request. The target bullet screen playback request is a bullet screen playback request received from the client 40 for a first time after the communication connection between the server 20 and the client 40 is established. The target bullet screen playback request may request a piece of initial bullet screen data for use by the client 20.

It should be noted that the target bullet screen playback request carries target live playback video information corresponding to the target live playback video. The server 20 can determine bullet screen data corresponding to the target live playback video according to the target live playback video information, and obtain the initial screen data from the bullet screen data corresponding to the target live playback video.

In some embodiments, the client 40 may obtain the target live playback video information when a target user accesses or logs in to a playback room of a live broadcast room corresponding to the target live playback video. After the client 40 obtains the target live playback video information, the target bullet screen playback request can be generated according to the target live playback video information, and the target bullet screen playback request is sent to the server 20, to cause the server 20 to return the initial bullet screen data according to the target bullet screen playback request.

Hereinafter, the "bullet screen for live broadcast playback" is referred to as "live bullet screen data", and the live bullet screen data is bullet screen data collected in a process of playing the target live playback video.

Step S102, in response to the bullet screen pull request, delivering a bullet screen segment file corresponding to the timestamp in N bullet screen segment files to the client; wherein the N bullet screen segment files are obtained by segmenting live bullet screen data corresponding to a target live playback video, and the N is a positive integer.

The N bullet screen segment files may be bullet screen segment files pre-processed and stored by the server 20. Specifically, after the server 20 collects the live bullet screen data, the live bullet screen data may be segmented according to bullet screen play time, to be divided into N bullet screen segment files; and the N bullet screen segment files obtained by the segmentation operation are saved for the client 40 to use.

In an exemplary embodiment, the step of generating the N bullet screen segment files in advance by the server 20 may be as follows: the server 20 may obtain live video time axis data associated with the target live playback video and the live bullet screen data in advance. The server 20 can determine a total duration of the target live video playback according to the live video time axis data to obtain the N live bullet screen segment data. The N live bullet screen segment data and the live video time axis data are bound and a format conversion is performed on bound N live bullet screen segment data to obtain the N bullet screen segment files. After the N bullet screen segment files are obtained, the server 20 may save the N bullet screen segment files in a database. In the embodiment, an occupancy rate of bullet screen data in the memory is reduced through segmenting the live bullet screen data corresponding to the target live playback video and sending the bullet screen segment files in a way of segmentation to the client.

The preset segment time may correspond to a playback duration of each video segment in the target live playback video. Taking the preset segment time of 6 minutes as an example, start playing time of all bullet screens of a first bullet screen segment file is between 0-th and 5-th minute of a playback progress of the target live playback video, and tart playing time of all bullet screens of a second bullet screen segment file is between 6-th and 11-th minute of the playback progress of the target live playback video, . . . start playing time of all bullet screens of an N-th bullet screen segment file is between (6N−6)-th and (6N−1)-th minute of the playback progress of the target live playback video.

In some embodiments, the live bullet screen data may include multiple types, for example, text bullet screen data and interactive bullet screen data. The text bullet screen data may be text bullet screen data sent by a user while watching a live video and the interactive bullet screen data may be bullet screen data of a user entering the live broadcast room or bullet screen data of a user rewarding an anchor. In order to distinguish the types of live bullet screen data, the server 20 may perform format conversion on the bound N live bullet screen segment data through a PB protocol. The PB protocol can classify different types of the live bullet screen data, so that the client 40 can determine the type of the live bullet screen data according to a type identifier of the live bullet screen data, which realizes accurate display of the bullet screen data and improves restoration of the bullet screen playback when the target live video is played back.

The bullet screen pull request requests the server 20 to obtain the bullet screen segment file corresponding to the timestamp from the database. Wherein, a time interval between two adjacent timestamps may be equal to the preset segment time.

In order to improve the synchronization rate of video playback and bullet screen playback of the target live playback video during playback, during the playback of the target live playback video, the client 40 needs to obtain a corresponding bullet screen segment file through the bullet screen pull request in advance to cache a part of the bullet screen data, so that when the target video is replayed, the bullet screen synchronized with a time axis of the target live playback video can be played at the same time. Therefore, the timestamp may be set before a segment time period corresponding to each bullet screen segment file. For example, when the segment time period corresponding to the second bullet screen segment file is between a 6-th minute and an 11-th minute, then the timestamp corresponding to the second bullet screen segment file may be earlier than the 6-th minute.

After receiving the bullet screen pull request, the server 20 may obtain the bullet screen segment file corresponding to the timestamp from the database according to the timestamp carried in the bullet screen pull request, and the bullet screen segment file may be one of the N bullet screen segment files.

In some embodiments, the target bullet screen playback request may be configured to request the server 20 to deliver the first bullet screen segment file of the N bullet screen segment files to the client 40. Therefore, after receiving the target bullet screen playback request, the server 20 can obtain the initial bullet screen segment file corresponding to the target bullet screen playback request from the database according to the target bullet screen playback request, and then deliver the initial bullet screen segment file to the client 40. The initial bullet screen segment file is the first bullet screen segment file of the N bullet screen segment files. The advantage of this is to increase the synchronization rate of video playback and bullet screen playback during the playback of the target live playback video. The specific reason is as follows: after the target user enters the playback room of the live broadcast room, the client 40 may pre-cache a part of the bullet screen data before playing the target live playback video. Therefore, after the target user enters the playback room of the live broadcast room, the client 40 can generate the target bullet screen playback request for requesting the server 20 to deliver the first bullet screen segment file of the N bullet screen segment files. The first bullet screen segment file is a first part of the bullet screen data corresponding to the target live playback video.

In the embodiment, the server 20 can segment the live bullet screen data corresponding to the target live playback video, and distribute the bullet screen segment files to the client 40 in a way of segmentation, so as to achieve reproduction of user behavior data (various types of bullet screen data) during live broadcast, and video progress control and double-speed playback are supported, the memory occupation rate of bullet screen data is reduced, and the playback fluency is improved.

To facilitate understanding, when the target user enters the playback room of the live broadcast room to play the target live playback video, the embodiment may include the following playback scenarios:

(1) When the target user enters the playback room of the live broadcast room, the client 40 will obtain the total duration of the target live playback video, the total number of bullet screen segment files, and start time and end time corresponding to each bullet screen segment file.

(2) When the target live playback video is playing, according to a time point of the current playback of the target live playback video, the client 40 may read the bullet screen segment file corresponding to the time point and pull a next bullet screen segment file in advance (For example, 2 minutes in advance). The client 40 may also cache the pulled bullet screen segment files in a local buffer area, so that the corresponding bullet screen can be played synchronously when the target live playback video is played.

(3) When the target user drags a progress bar of the target live playback video, according to a time point reached after dragging, the client 40 can query whether 200 bullet screens before the time point exist in a bullet screen segment file in the local cache. When there are no 200 bullet screens before the time point in the bullet screen segment file in the local cache, the bullet screen segment file corresponding to the 200 bullet screens is pulled from the server 20, and then the 200 bullet screens are rendered directly in a current interactive area.

(4) When the target live playback video is playing, the client 40 may set an update frequency of the bullet screen (bullet screen playing speed). Taking the update frequency of 0.5 seconds as an example, the client 40 can obtain all bullet screens within a next 0.5 seconds according to the current playback time point, and when the playback time point reaches the "within the next 0.5 second", all the bullet screens of the "within the next 0.5 seconds" are displayed in the bullet screen display area.

(5) The bullet screen playback speed of the target live playback video is adjusted with the video playing speed. For example, when the playback speed is changed, the bullet screen playback speed may be changed with the playback speed. That is, when the playback speed is 2 times, the bullet screen playback speed is also adjusted to 2 times. Wherein, the playing speed of the bullet screen can be changed by controlling a time interval of each bounce of the bullet screen. In addition, when the playing speed of the bullet screen is accelerated, a number of bullet screens read from the memory can also be increased.

Embodiment 2

Figure 3:
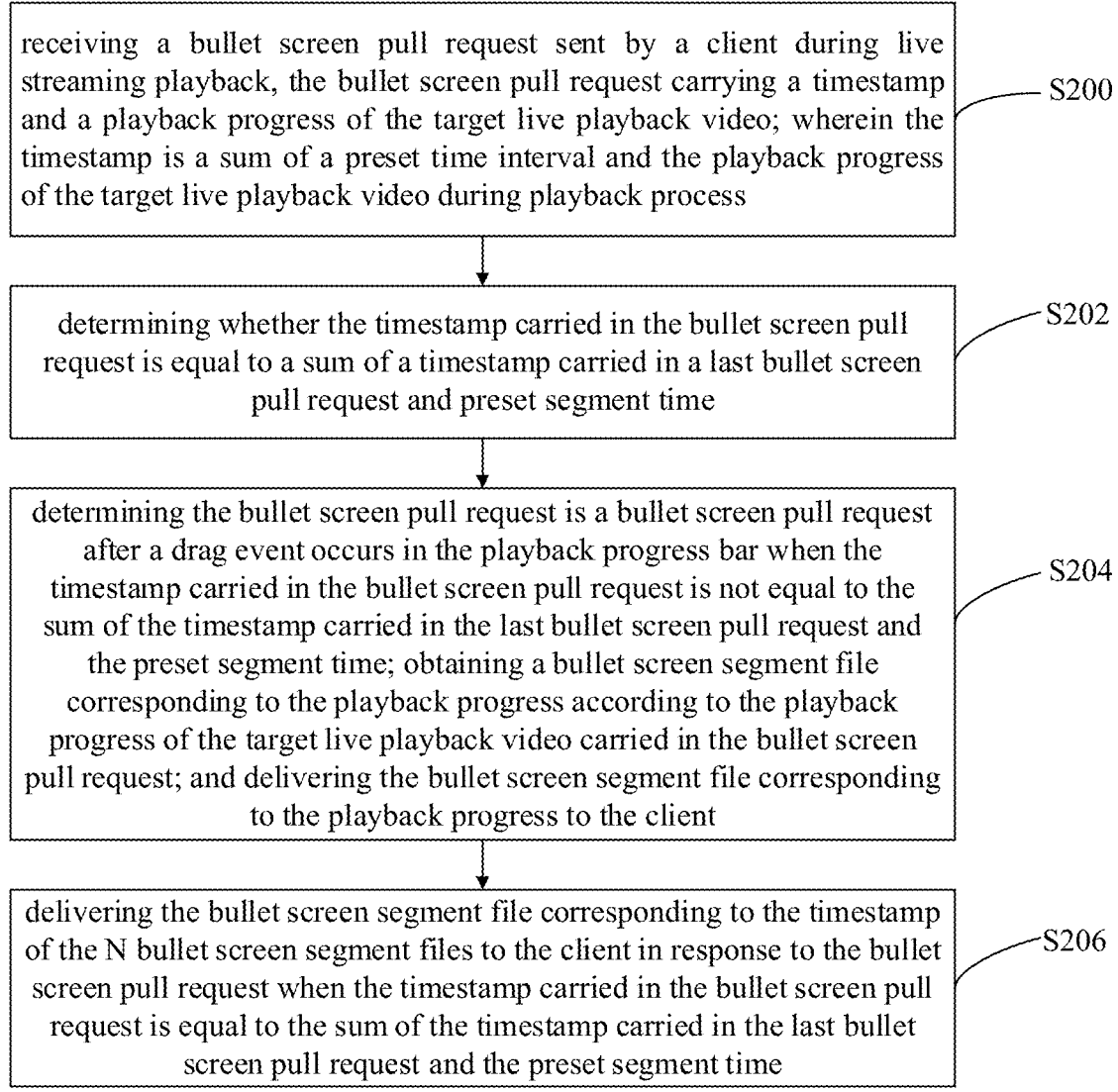
FIG. 3 schematically shows a flowchart of a bullet screen delivery method for live broadcast playback according to a second embodiment of the present application.

FIG. 3 schematically shows a flowchart of a bullet screen delivery method for live broadcast playback according to a second embodiment of the present application.

As shown in FIG. 3, the bullet screen delivery method for live broadcast playback may include steps S200 to S206, wherein:

Step S200, receiving a bullet screen pull request sent by a client during live broadcast playback, the bullet screen pull request carrying a timestamp and a playback progress of the target live playback video; wherein the timestamp is a sum of a preset time interval and the playback progress of the target live playback video during playback process.

The timestamp corresponds to a point on a time axis of the target live playback video, and different bullet screen pull requests carry different timestamps. The timestamp is the sum of the preset time interval and the playback progress of the target live playback video during the playback process.

In an exemplary embodiment, the server 20 may configure multiple timestamps according to segment time corresponding to the bullet screen segment files, and deliver the timestamps to the client 40, wherein a bullet screen segment file corresponds to a timestamp. During playback of the target live playback video, the client 40 may monitor a playback progress bar of the target live playback video. When a sum of the playback progress and the previous time interval is detected to be equal to one of multiple timestamps, the client 40 can generate a bullet screen pull request according to the timestamp corresponding to the playback progress, and send the bullet screen pull request to the server 20.

The preset time interval can be two minutes, and the multiple timestamps take 6-th minute, 12-th minute, and 6N-th minute as examples respectively: when the playback progress of the playback progress bar reaches 4-th minute, 10-th minute, and (6n−2)-th minute respectively, the client 40 can generate a bullet screen pull request carries a timestamp of 6-th minute, a bullet screen pull request carries 12-th minute and a bullet screen pull request carries 6N-th minute. Step S202, determining whether the timestamp carried in the bullet screen pull request is equal to a sum of a timestamp carried in a last bullet screen pull request and preset segment time.

Through the determination step, the server 20 can determine whether a playback state of the target live playback video is in a normal playback state. The normal playback state is different from an abnormal playback state. The normal playback state is that the client 40 performs normal playback according to a time sequence of each video frame in the target live playback video. The abnormal playback state is that a current playback video frame and a last playback video frame are two discontinuous video frames caused by the progress bar being dragged, that is, there are multiple other video frames between them.

Step S204, determining the bullet screen pull request is a bullet screen pull request after a drag event occurs in the playback progress bar when the timestamp carried in the bullet screen pull request is not equal to the sum of the timestamp carried in the last bullet screen pull request and the preset segment time; obtaining a bullet screen segment file corresponding to the playback progress according to the playback progress of the target live playback video carried in the bullet screen pull request; and delivering the bullet screen segment file corresponding to the playback progress to the client.

When the timestamp carried in the bullet screen pull request is not equal to the sum of the timestamp carried in the last bullet screen pull request and the preset segment time, it can be determined that the playback progress bar of the target live playback video has been dragged. That is, it can be determined that the bullet screen pull request is the bullet screen pull request after a drag event occurs in the playback progress bar. When the bullet screen pull request is a bullet screen pull request after a drag event occurs in the playback progress bar, the server 20, according to the playback progress of the target live playback video carried in the bullet screen pull request, may obtain the bullet screen segment file corresponding to the playback progress; and the bullet screen segment file corresponding to the playback progress is delivered to the client 40.

Step S206, delivering the bullet screen segment file corresponding to the timestamp of the N bullet screen segment files to the client in response to the bullet screen pull request when the timestamp carried in the bullet screen pull request is equal to the sum of the timestamp carried in the last bullet screen pull request and the preset segment time.

When the timestamp carried in the bullet screen pull request is equal to the sum of the timestamp carried in the last bullet screen pull request and the preset segment time, it means that the target live playback video is in the normal playback state, that is, normal playback is based on a time sequence. The server 20 may obtain the bullet screen segment file corresponding to the timestamp according to the timestamp carried in the bullet screen pull request.

In the embodiment, when the playback state of the target live playback video is in the normal playback state, the client 40 may pull the bullet screen data in advance and cache it in the memory, so that when the target live playback video is played back, the bullet screen can be directly taken from the memory for playing. However, when the playback state of the target live playback video is not in the normal playback state, that is when the playback progress bar of the target live playback video has a drag event, and when the playback progress bar is dragged to a time point of which corresponding bullet screens is not cached in the memory, there will be no corresponding bullet screen in the current play screen of the target live playback video. With regards to this problem, the bullet screen pull request in the embodiment may also carry the playback progress of the target live playback video, that is, the bullet screen pull request may carry a timestamp or playback progress. When receiving a bullet screen pull request, the server 20 can determine whether the timestamp carried in the bullet screen pull request is equal to the sum of the timestamp carried in the last bullet screen pull request and the preset segment time, to determine whether the playback state of the target live playback video is in the normal playback state or the abnormal playback state, and to determine whether the corresponding bullet screen segment file is determined by the timestamp or by the playback progress according to the playback status.

In the embodiment, the server 20 can determine that the bullet screen pull request belongs to the bullet screen pull request generated by the normal playback of the target live playback video, and obtain the corresponding bullet screen segment file according to a determination result, which improves the accuracy of the bullet screen pull request to pull the bullet screen segment file.

Figure 4:
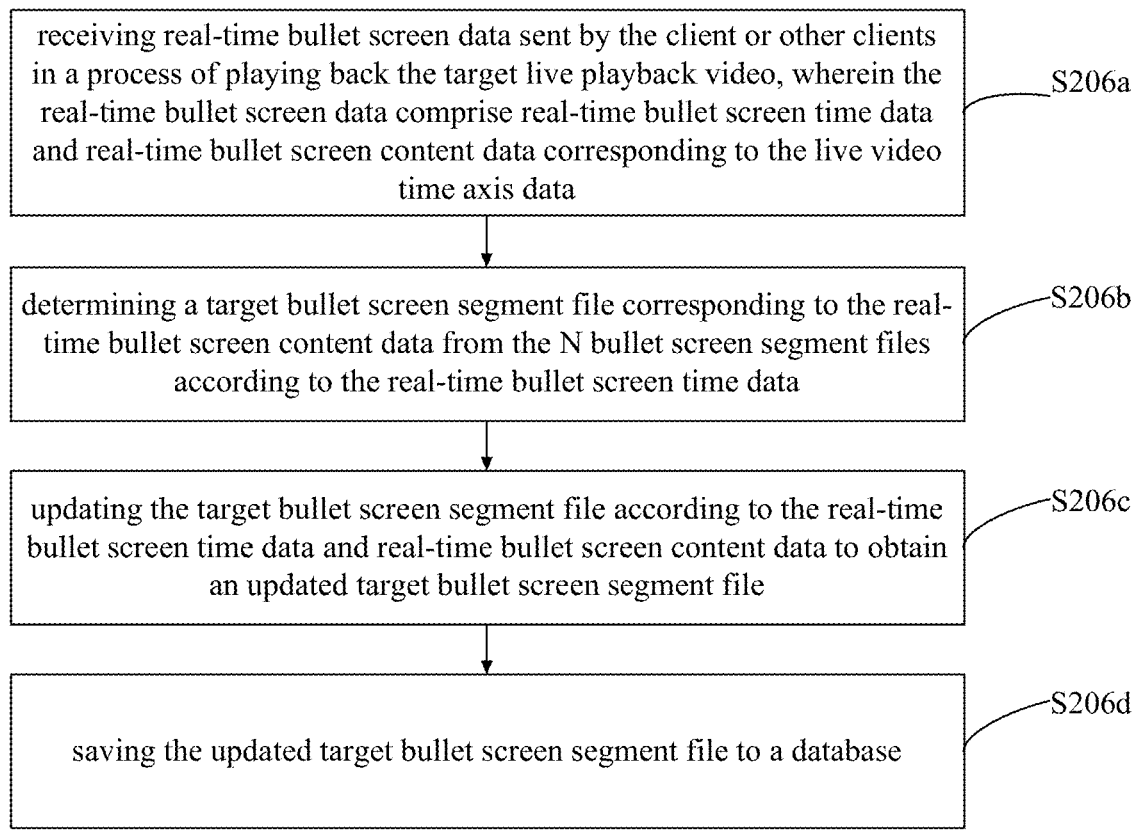
FIG. 4 schematically shows a specific flowchart of step S206 in FIG. 3.

As shown in FIG. 4, the bullet screen delivery method for live broadcast playback can further comprise step S206a~S206d, wherein: step S206a, receiving real-time bullet screen data sent by the client or other clients in a process of playing back the target live playback video, wherein the real-time bullet screen data comprise real-time bullet screen time data and real-time bullet screen content data corresponding to the live video time axis data; step S206b, determining a target bullet screen segment file corresponding to the real-time bullet screen content data from the N bullet screen segment files according to the real-time bullet screen time data; step S206c, updating the target bullet screen segment file according to the real-time bullet screen time data and real-time bullet screen content data to obtain an updated target bullet screen segment file; step S206d, saving the updated target bullet screen segment file to a database. It should be noted that the database may be an internal database of the server 20 or an external database, which may be configured to store bullet screens and various data related to the bullet screens.

In the process of the client 40 playing back the target live playback video, users can send real-time bullet screen data by the client, and after receiving the real-time bullet screen data, the client sends the real-time bullet screen data to the server 20 for data integration with segmented historical bullet screen data (for example, live bullet screen data). The real-time bullet screen data includes real-time bullet screen time data and real-time bullet screen content data corresponding to the live video time axis data. The real-time bullet screen time data is time data of the real-time bullet screen data, for example, a time when the bullet screen is sent, the "time" here refers to the time corresponding to the live video time axis data. The real-time bullet screen content data is bullet screen content.

After the server 20 receives the real-time bullet screen data, the server 20 can determine the target bullet screen segment file corresponding to the real-time bullet screen content data from the N bullet screen segment files according to the real-time bullet screen time data in the real-time bullet screen data, and update the target bullet screen segment according to the real-time bullet screen time data and the real-time bullet screen content data to obtain the updated target bullet screen segment file. For example, after determining the target bullet screen segment file, the server 20 can bind the real-time bullet screen content data and the live video time axis data corresponding to the real-time bullet screen time data to obtain the real-time bullet screen data; and analyze the target bullet screen segment file to obtain the target bullet screen segment data; and perform a format conversion on the real-time bullet screen data and the target bullet screen segment data to obtain the updated target bullet screen segment file. After obtaining the updated target bullet screen segment, the server 20 may save the updated target bullet screen segment file to the database.

In the embodiment, during the playback of the target live playback video, the server 20 can receive the real-time bullet screen provided by the client 40, and can update the original bullet screen segment file to enrich the bullet screen content.

Figure 5:
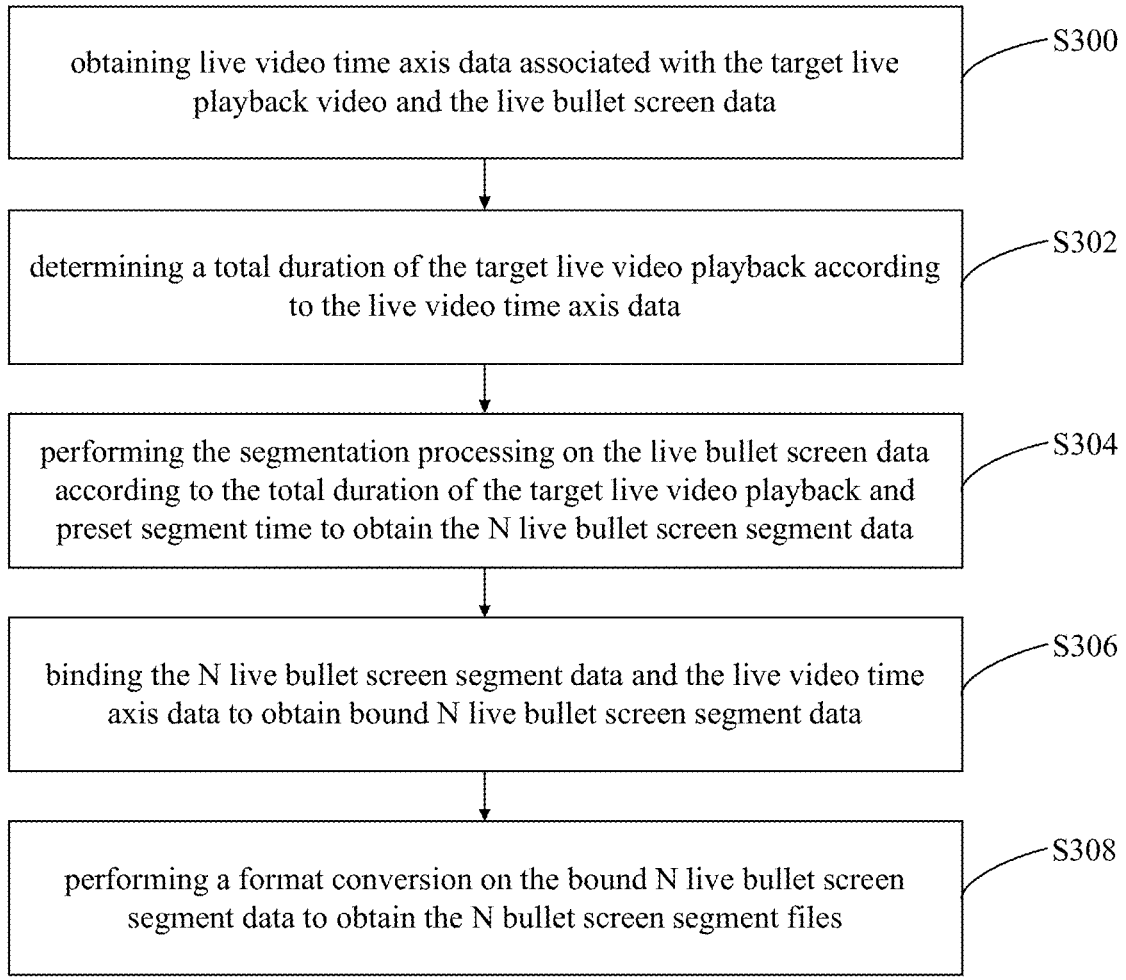
FIG. 5 schematically shows a flowchart of a bullet screen delivery method for live broadcast playback according to a second embodiment of the present application.

As shown in FIG. 5, the bullet screen delivery method for live broadcast playback may include steps S300 to S308 of generating the N bullet screen segment files in advance, wherein:

Step S300, obtaining live video time axis data associated with the target live playback video and the live bullet screen data; step S302, determining a total duration of the target live video playback according to the live video time axis data; step S304, performing the segmentation processing on the live bullet screen data according to the total duration of the target live video playback and preset segment time to obtain the N live bullet screen segment data; step S306, binding the N live bullet screen segment data and the live video time axis data to obtain bound N live bullet screen segment data; and step S308, performing a format conversion on the bound N live bullet screen segment data to obtain the N bullet screen segment files.

In an exemplary embodiment, the server 20 may obtain the live video time axis data associated with the target live playback video and the live bullet screen data in advance. The server 20 may determine the total duration of the target live playback video according to the live video time axis data; and performing a segmentation processing on the live bullet screen data according to the total duration of the target live playback video and the preset segment time. Then the N live bullet screen segment data and the live video time axis data are bound, and the format conversion is performed on the bound N live bullet screen segment data to obtain the N bullet screen segment files. After obtaining the N bullet screen segment files, the server 20 may save the N bullet screen segment files in the database.

Wherein, the preset segment time may be a play duration of all bullet screens in each bullet screen segment file. Take the preset segment time of 6 minutes as an example. Then all bullet screens in a first bullet screen segment file of the N bullet screen segment files are bullet screens of the target live playback video within 0-th minute to 5-th minute; all bullet screens in a second bullet screen segment file are bullet screens of the target live playback video within 6-th minute to 11-th minute; all bullet screens in a N-th bullet screen segment file is bullet screens of the target live playback video within (6N−6)-th minute to (6N−1)-th minute.

The server 20 divides the live bullet screen data into multiple bullet screen segment files, and sends a corresponding single bullet screen segment file to the client 40 in response to a request of the client, so as to reduce the occupancy rate of bullet screen data in the memory of the client 40 and improve the playback fluency.

Embodiment 3

Figure 6:
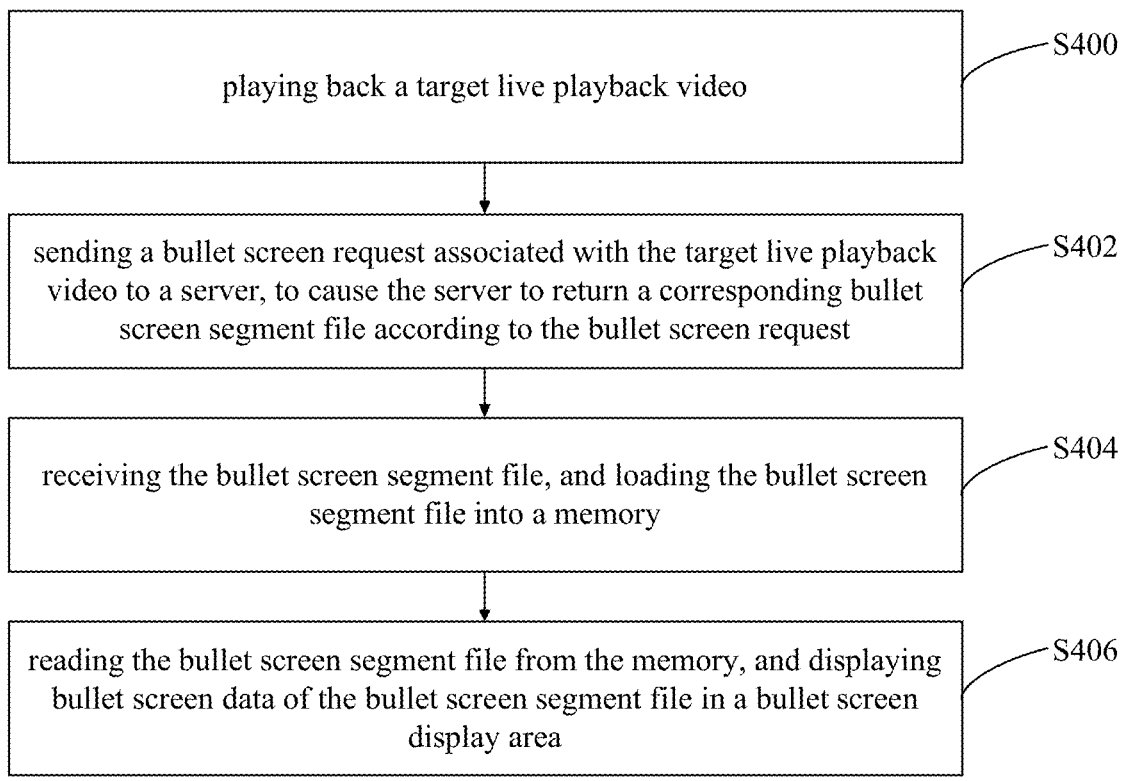
FIG. 6 schematically shows a flowchart of a live video bullet screen playback method, according to a third embodiment of the present application.

FIG. 6 schematically shows a flowchart of a live video bullet screen playback method, according to a third embodiment of the present application. The embodiment can be executed in a computer device (for example, the client 40 in FIG. 1). It can be understood that the flowchart in the embodiment of the method is not used to limit the order of execution of the steps.

As shown in FIG. 6, the live video bullet screen playback method can comprise step S400~S406, wherein:

Step S400, playing back a target live playback video.

The client 40 may play back the target live playback video according to a playback instruction input by a target user, and the target live playback video may be a live video carrying a bullet screen. It is not difficult to understand that after a live broadcast anchor of the target live playback video is offline, the target user can watch the playback of the target live playback video on the client 40.

Step S402, sending a bullet screen request associated with the target live playback video to a server, to cause the server to return a corresponding bullet screen segment file according to the bullet screen request.

The bullet screen request is configured to instruct the server 20 to return a bullet screen segment file corresponding to the bullet screen request. The bullet screen segment file is one of N bullet screen segment files generated by the server 20 in advance based on multiple pieces of bullet screen data corresponding to the target live playback video. When the target user plays back the target live playback video, the client 40 may generate a bullet screen request of the target live playback video to cause the server 20 to return the corresponding bullet screen segment file according to the bullet screen request.

Step S404, receiving the bullet screen segment file, and loading the bullet screen segment file into a memory.

After receiving the bullet screen segment file, the client 40 can analyze the bullet screen segment file to obtain bullet screen analysis data. The client 40 can load the bullet screen analysis data into the memory after obtaining the bullet screen analysis data.

Step S406, reading the bullet screen segment file from the memory, and displaying bullet screen data of the bullet screen segment file in a bullet screen display area.

The client 40 may monitor a playback progress of the target live playback video, read the bullet screen analysis data corresponding to the playback progress from the memory according to the playback progress, and render the bullet screen analysis data to display rendered bullet screen analysis data in the bullet screen display area.

In an exemplary embodiment, the bullet screen analysis data can comprise interactive bullet screen analysis data and text bullet screen analysis data, and the bullet screen display area includes an interactive bullet screen area and a text bullet screen area. The client 40 may perform a classification operation on the bullet screen analysis data after obtaining the bullet screen analysis data, to obtain interactive bullet screen analysis data and text bullet screen analysis data. The client 40 may respectively render the interactive bullet screen analysis data and the text bullet screen analysis data, and display rendered interactive bullet screen analysis data in the interactive bullet screen area, and display rendered text bullet screen analysis data in the text bullet screen area. The bullet screen of the interactive bullet screen area may be an entry prompt bullet screen for the user to enter the live broadcast room, or a reward bullet screen for the user to reward an anchor, etc. The bullet screen in the text bullet screen area can be a text bullet screen sent by the user when watching a live video.

At present, the playback method of live video with bullet screens is usually to send recorded live video and text bullet screens bound to a live video time axis to the client 40 at the same time, so as to realize simultaneous viewing of the live bullet screen during live playback. However, this playback method will occupy a large amount of memory in the client 40, which may cause the video playback to be stuck and not smooth; and text bullet screens can be only seen in a corresponding time point of the time axis, and bullet screens of the live broadcast scene cannot be completely restored. In the embodiment, the client 40 obtains a part of the bullet screen data from the server 20 when the target live playback video is played back, and caches it in the memory, which reduces the occupancy rate of the bullet screen data in the memory and improves playback fluency. By classifying the bullet screen analysis data and displaying the bullet screen analysis data in the corresponding bullet screen display area, not only the textual text bullet screen can be viewed during video playback, but also the interactive bullet screen can be viewed in the interactive display area, which improves restoration of the bullet screen of the target live playback video.

Embodiment 4

Figure 7:
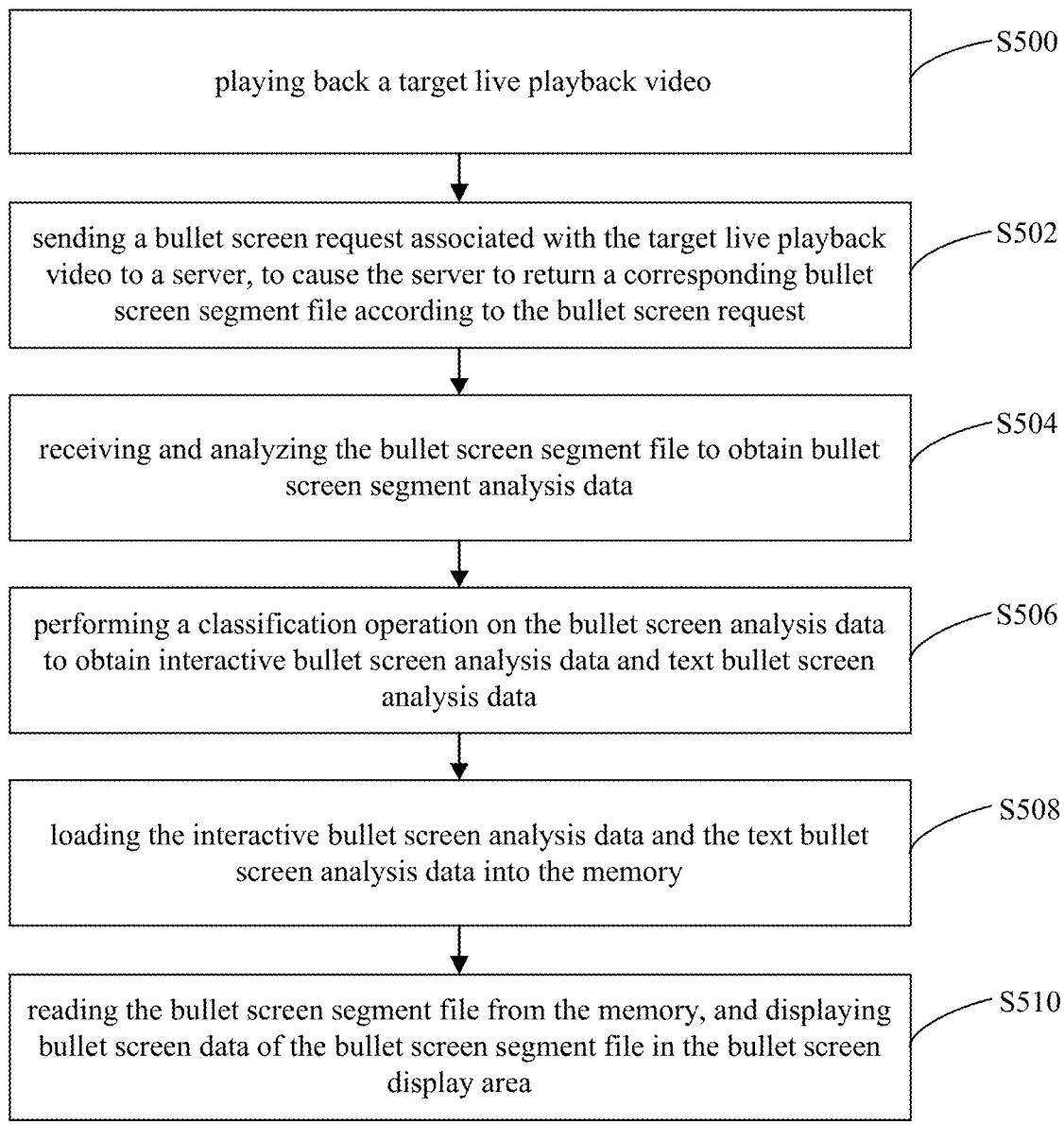
FIG. 7 schematically shows a flowchart of a live video bullet screen playback method, according to a fourth embodiment of the present application.

FIG. 7 schematically shows a flowchart of a live video bullet screen playback method, according to a fourth embodiment of the present application.

As shown in FIG. 7, the live video bullet screen playback method can comprise step S500~S510, wherein:

Step S500, playing back a target live playback video.

The client 40 may play back the target live playback video according to a playback instruction input by a target user, and the target live playback video may be a live video carrying a bullet screen. It is not difficult to understand that after a live broadcast anchor of the target live playback video is offline, the target user can watch the playback of the target live playback video on the client 40.

Step S502, sending a bullet screen request associated with the target live playback video to a server, to cause the server to return a corresponding bullet screen segment file according to the bullet screen request.

Figure 8:
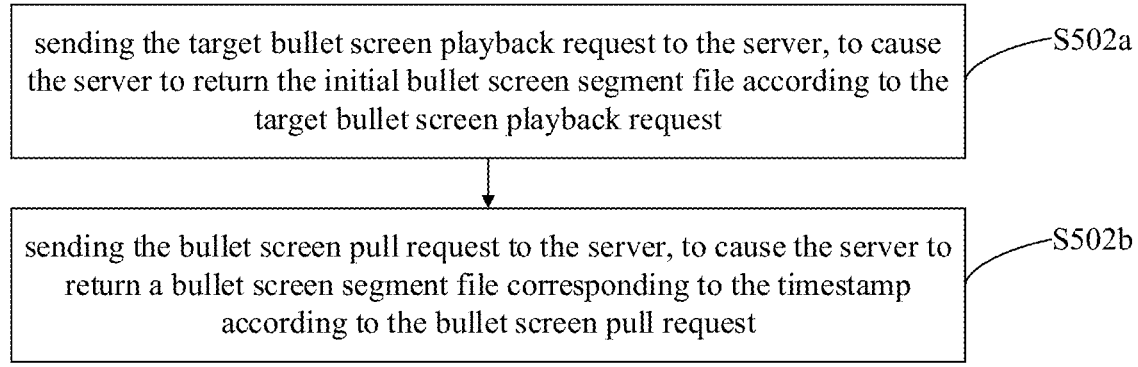
FIG. 8 schematically shows a specific flowchart of step S502 in FIG. 7.

In an exemplary embodiment, the bullet screen request comprises a target bullet screen playback request, and the target bullet screen playback request is configured to obtain an initial bullet screen segment file;

As shown in FIG. 8, the step S502 further can comprise step S502a~step S502b, wherein:

Step S502a, sending the target bullet screen playback request to the server, to cause the server to return the initial bullet screen segment file according to the target bullet screen playback request.

In the embodiment, by sending the bullet screen request associated with the target live playback video to the server, to cause the server 20 to return the corresponding bullet screen segment file before the target live playback video is played back, which improves synchronization rate of the video playback and bullet screen appearance during the playback of the target live playback video.

In an exemplary embodiment, the bullet screen request comprises a bullet screen pull request carrying a timestamp.

Step S502b, sending the bullet screen pull request to the server, to cause the server to return a bullet screen segment file corresponding to the timestamp according to the bullet screen pull request.

It should be understood that when the target live playback video is played back to a time point corresponding to the timestamp, the client 40 can generate a bullet screen pull request carrying a timestamp and send the bullet screen pull request carrying the timestamp to the server 20, to cause the server to return the bullet screen segment file corresponding to the timestamp according to the bullet screen request carrying the timestamp.

In the embodiment, when the target live playback video is played back, the client 40 can request the bullet screen segment files from the server 20 in batches, and the memory consumption is reduced by requesting the bullet screen segment files from the server 20 in batches.

Figure 9:
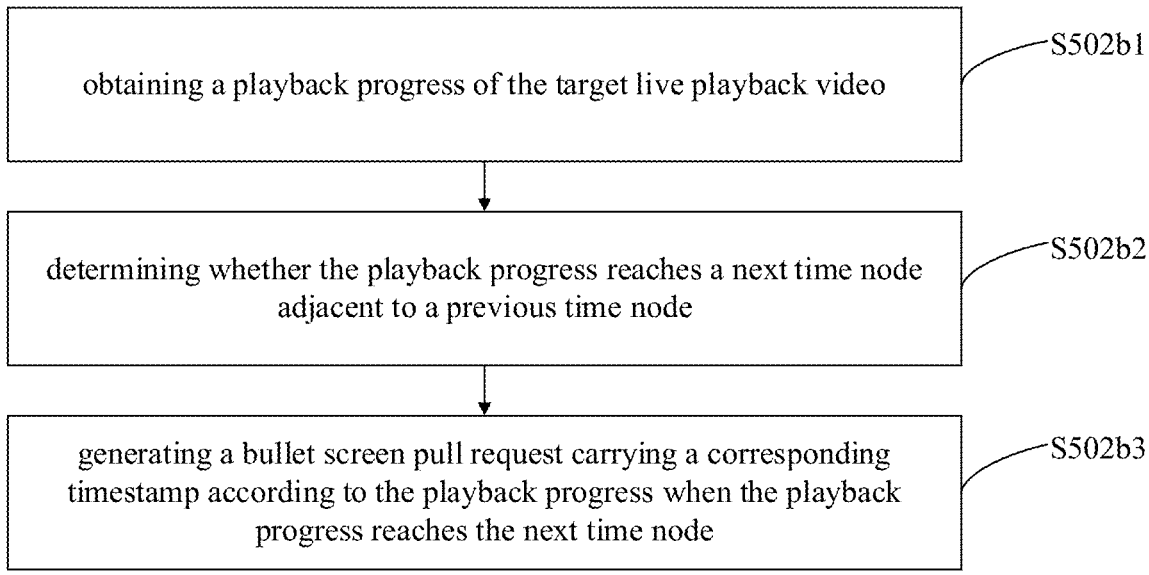
FIG. 9 schematically shows a specific flowchart of step S502b in FIG. 8.

As shown in FIG. 9, the step S502b further comprises step S502b1~step S502b3, wherein: step S502b1, obtaining a playback progress of the target live playback video; step S502b2, determining whether the playback progress reaches a next time node adjacent to a previous time node; step S502b3, generating a bullet screen pull request carrying a corresponding timestamp according to the playback progress when the playback progress reaches the next time node.

During the playback process of the target live playback video, the client 40 can monitor the playback progress bar of the target live playback video and obtain the playback progress of the target live playback video.

The client 40 can determine whether the playback progress reaches the next time node adjacent to the previous time node. The time node can be determined according to preset segment time and preset time interval, and the preset segment time can correspond to a playback duration of each video segment in the target live playback video. Wherein, a video segment corresponds to a bullet screen segment file. The time interval is a time interval between the timestamp and a corresponding time node. Taking the preset segment time of 6 minutes and the preset time interval of 2 minutes as an example, a first time node of the target live playback video can be 4-th minute, a second time node can be 10-th minute, and a N-th time node can be (6n−2)-th minute.

When the playback progress reaches the next time node, the client 40 can generate a bullet screen pull request carrying the corresponding timestamp according to the playback progress. For example, when the next time node is 10-th minute, the time corresponding to the timestamp is 12-th minute. That is, when the next time node is 10-th minute, the client 40 generates a bullet screen pull request carrying a timestamp of 12-th minute.

In the embodiment, the playback progress of the target live playback video can be adjusted (dragging the playback progress bar of the target live playback video) when the target live playback video is played back. However, adjusting the playback progress of the target live playback video may result in no cache of the bullet screen data corresponding to the adjusted playback progress in the memory, and the target live playback video will continue to play without corresponding bullet screens at this time. Therefore, the client 40 may determine whether the playback progress of the target live playback video is dragged, and generate a corresponding bullet screen pull request according to a determination result, which improves the accuracy of the screen pull request to pull the screen segment file.

Step S504, receiving and analyzing the bullet screen segment file to obtain bullet screen analysis data.

After receiving the bullet screen segment file, the client 40 may analyze the bullet screen segment file to obtain the bullet screen analysis data. The client 40 may load the bullet screen analysis data into the memory after obtaining the bullet screen analysis data.

Step S506, performing a classification operation on the bullet screen analysis data to obtain interactive bullet screen analysis data and text bullet screen analysis data.

Step S508, loading the interactive bullet screen analysis data and the text bullet screen analysis data into the memory.

The bullet screens in the bullet screen segment file comprise interactive bullet screens and text bullet screens, and the interactive bullet screens can be entry prompt bullet screens for users to enter the live broadcast room, reward bullet screens for users to reward anchors, etc. The bullet screen in the text bullet screen area may be a text bullet screen sent by the user when watching a live video. It is not difficult to understand that the bullet screen segment file is obtained by the server 20 after the format conversion is performed on the bullet screen data according to a predetermined format conversion protocol (such as Pb protocol). The client 40 can obtain the bullet screen analysis data by analyzing the bullet screen partition file. In the embodiment, the client 40 performs the classification operation on the bullet screen analysis data and displays the bullet screen analysis data in the corresponding bullet screen display area, so that not only the textual text bullet screen can be viewed during video playback, but also the interactive bullet screen can be viewed in the interactive display area, which improves restoration of the bullet screen of the target live playback video.

Step S510, reading the bullet screen segment file from the memory, and displaying bullet screen data of the bullet screen segment file in the bullet screen display area.

The client 40 can monitor the playback progress of the target live playback video, read the bullet screen analysis data corresponding to the playback progress from the memory according to the playback progress, and render the bullet screen analysis data to display the rendered bullet screen analysis data in the bullet screen display area.

Figure 10:
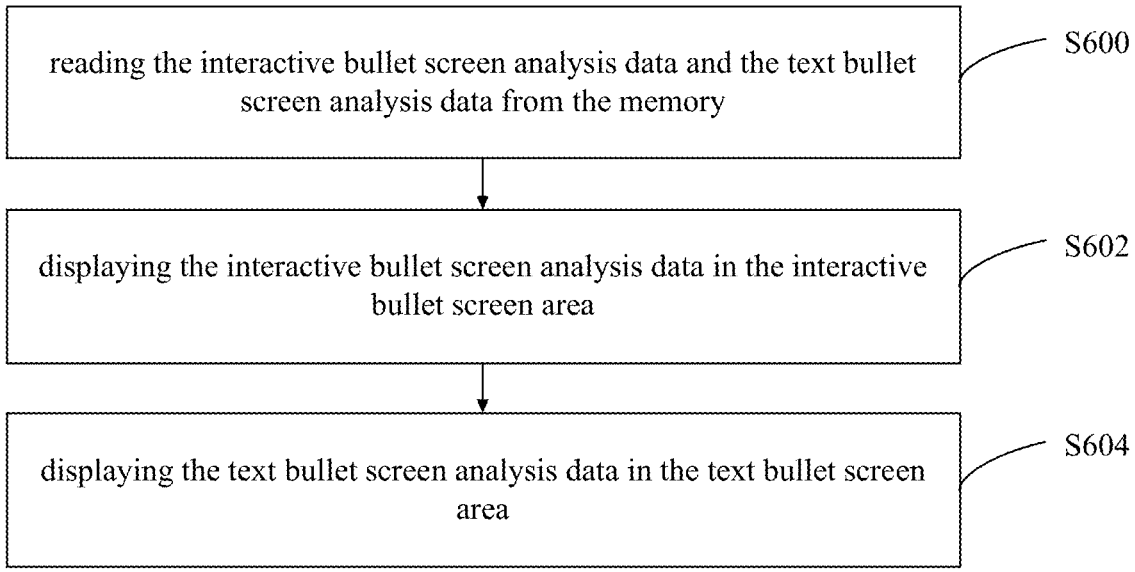
FIG. 10 schematically shows a specific flowchart of step S510 in FIG. 7.

As shown in FIG. 10, the step S510 may further comprise steps S600 to S604, wherein: step S600, reading the interactive bullet screen analysis data and the text bullet screen analysis data from the memory; step S602, displaying the interactive bullet screen analysis data in the interactive bullet screen area; and step S604, displaying the text bullet screen analysis data in the text bullet screen area.

During the playback of the target live video, the client 40 can read the interactive screen analysis data and the text screen analysis data from the memory, and display the interactive bullet screen analysis data and the text bullet screen analysis data read from the memory in the interactive bullet screen area and the text bullet screen area respectively. In the embodiment, the client 40 displays the text bullet screen analysis data in the text bullet screen area and displays the interactive screen analysis data in the interactive screen area, so that not only the textual text bullet screen can be viewed during video playback, but also the interactive bullet screen can be viewed in the interactive display area, which improves restoration of the bullet screen of the target live playback video.

Figure 11:
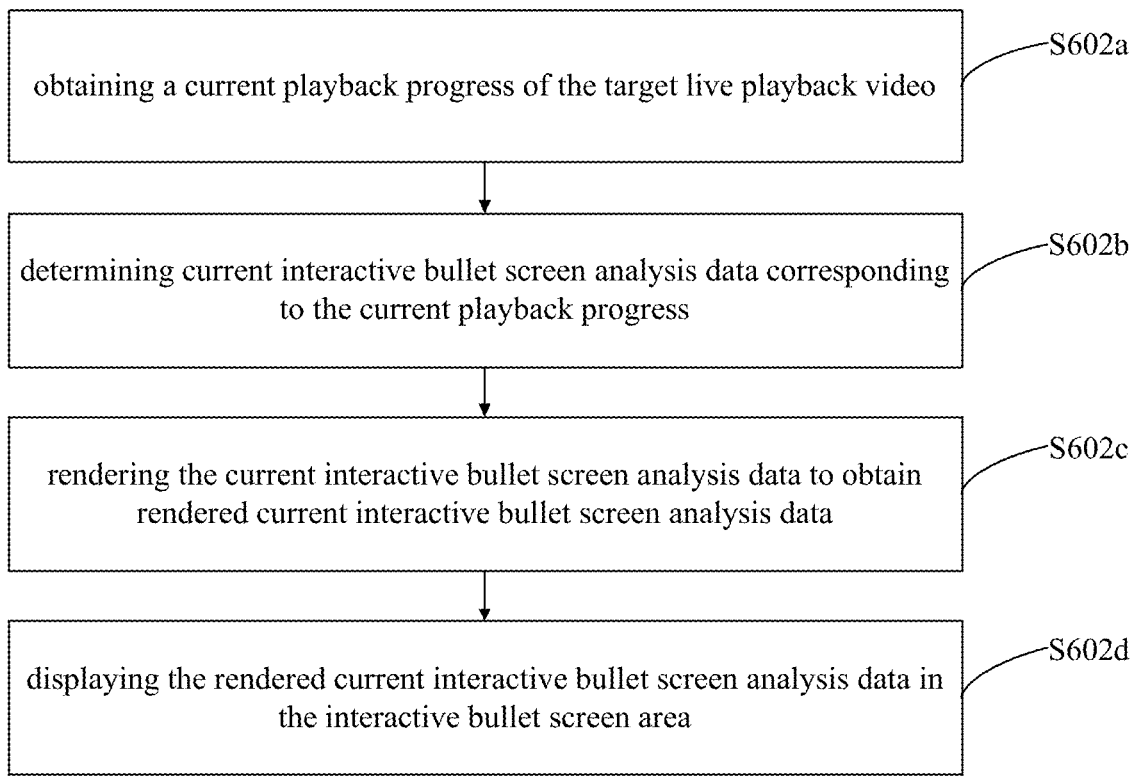
FIG. 11 schematically shows a specific flowchart of step S602 in FIG. 10.

As shown in FIG. 11, the step S602 may further comprise steps S602a to S602d, wherein: S602a, obtaining a current playback progress of the target live playback video; S602b, determining current interactive bullet screen analysis data corresponding to the current playback progress; S602c, rendering the current interactive bullet screen analysis data to obtain rendered current interactive bullet screen analysis data; S602d, displaying the rendered current interactive bullet screen analysis data in the interactive bullet screen area.

The client 40 can determine the current interactive bullet screen analysis data corresponding to the current playback progress according to the current playback progress of the target live playback video, and render the current interactive bullet screen analysis data. Wherein, the interactive bullet screen analysis data carries time axis data of the target live playback video corresponding to the interactive bullet screen analysis data. The client 40 can determine the current interactive screen analysis data according to the current playback progress and the time axis data in the interactive screen analysis data. The embodiment improves the accuracy of bullet screen playback by displaying the interactive bullet screen analysis data in the interactive bullet screen area.

In some embodiments, the client 40 may obtain the current playback progress at a preset time frequency. For example, the client 40 can configure a timer in advance to obtain the playback progress by setting acquisition time of the timer, and the acquisition time can be set to 0.5 seconds, that is, the client 40 can obtain the playback progress every 0.5 seconds.

Figure 12:
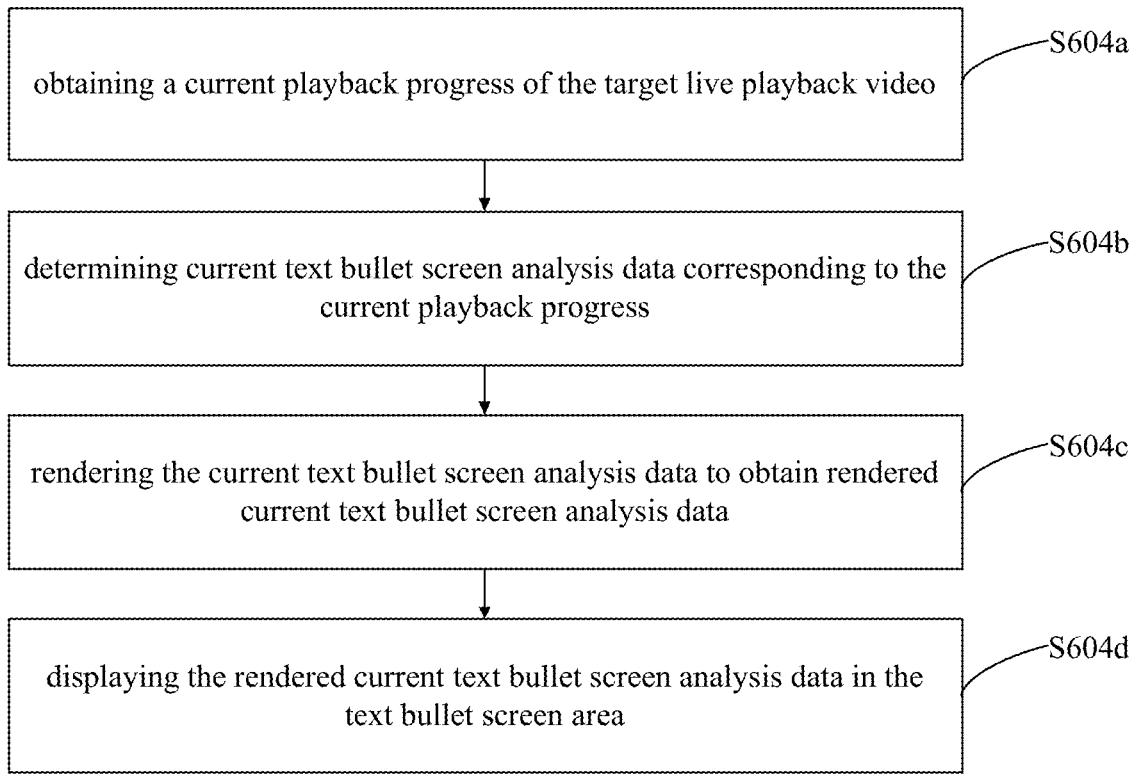
FIG. 12 schematically shows a specific flowchart of step S604 in FIG. 10.

As shown in FIG. 12, the step S604 may further comprise steps S604a to S604d, wherein: step S604a, obtaining a current playback progress of the target live playback video; step S604b, determining current text bullet screen analysis data corresponding to the current playback progress; step S604c, rendering the current text bullet screen analysis data to obtain rendered current text bullet screen analysis data; and step S604d, displaying the rendered current text bullet screen analysis data in the text bullet screen area.

The client 40 can determine the current text bullet screen analysis data corresponding to the current playback progress according to the current playback progress of the target live playback video, and render the current text bullet screen analysis data. Wherein, the interactive bullet screen analysis data carries time axis data of the target live playback video corresponding to the text bullet screen analysis data. The client 40 can determine the current text bullet screen analysis data according to the current playback progress and the time axis data in the text bullet screen analysis data. The embodiment improves the accuracy of bullet screen playback by displaying the text bullet screen analysis data in the text bullet screen area, and improves the restoration of the bullet screen of the target live playback video by classifying the bullet screen analysis data and displaying the bullet screen analysis data in the corresponding bullet screen display area.

Figure 13:
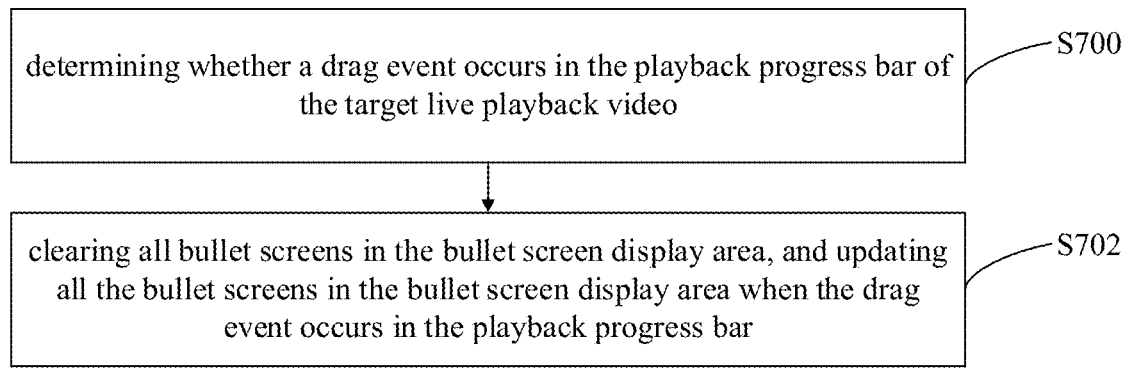
FIG. 13 schematically shows a flowchart of a live video bullet screen playback method, according to a fourth embodiment of the present application.

As shown in FIG. 13, the live video bullet screen playback method can further comprise steps S700-702, wherein:

Step S700, determining whether a drag event occurs in the playback progress bar of the target live playback video; and step S702, clearing all bullet screens in the bullet screen display area, and updating all the bullet screens in the bullet screen display area when the drag event occurs in the playback progress bar.

It is not difficult to understand that the target user can drag the playback progress bar when watching the target live playback video. When the client 40 detects a drag event occurs in the playback progress bar of the target live playback video, the client 40 can obtain the current playback progress of the playback progress bar, and can generate a bullet screen pull request carrying the current playback progress according to the current playback progress, and send the bullet screen pull request carrying the current playback progress to the server 20, so that the server 20 returns the bullet screen segment file corresponding to the current playback progress according to the bullet screen pull request carrying the current playback progress. In addition, when detecting a drag event occurs in the playback progress bar of the target live playback video, the client 40 can also clear all bullet screens in the bullet screen display area, and update all bullet screens in the bullet screen display area according to the bullet screen segment file corresponding to the current playback progress.

Figure 14:
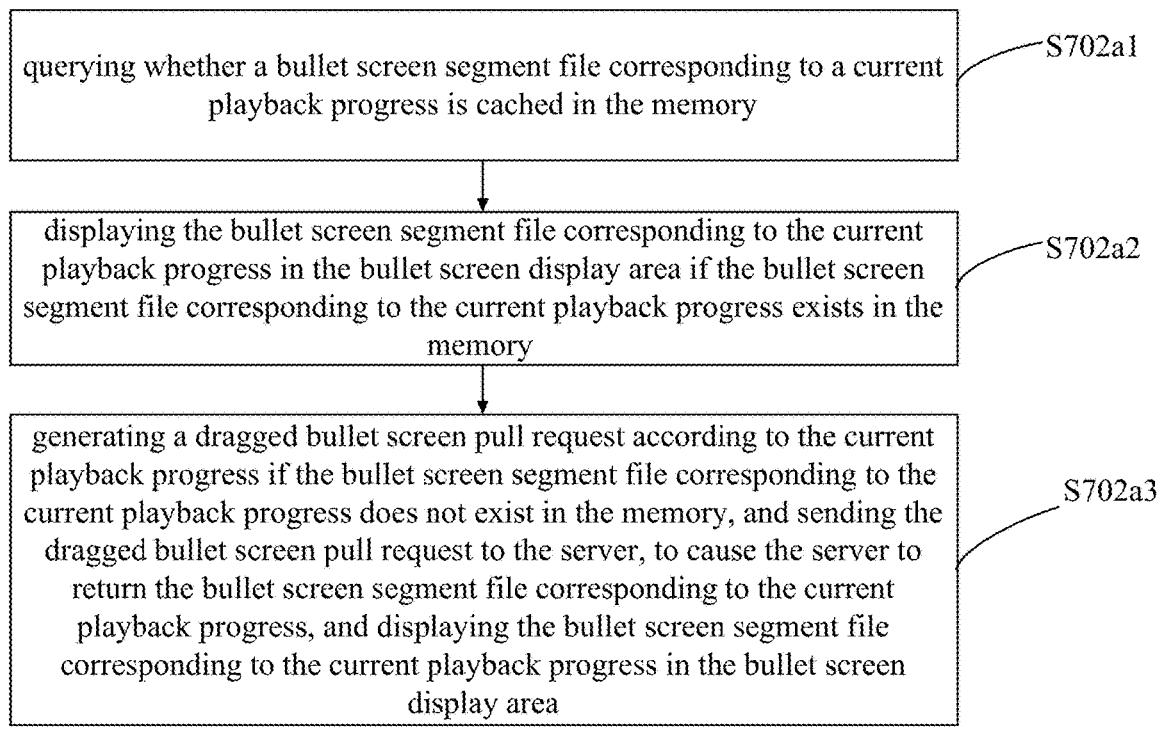
FIG. 14 schematically shows another specific flowchart of step S702 in FIG. 13.

As shown in FIG. 14, the step S702 can further comprise step S702a1~S702a3, wherein: step S702a1, querying whether a bullet screen segment file corresponding to a current playback progress is cached in the memory; step S702a2, displaying the bullet screen segment file corresponding to the current playback progress in the bullet screen display area when the bullet screen segment file corresponding to the current playback progress exists in the memory; and step S702a3, generating a dragged bullet screen pull request according to the current playback progress when the bullet screen segment file corresponding to the current playback progress does not exist in the memory, and sending the dragged bullet screen pull request to the server, to cause the server to return the bullet screen segment file corresponding to the current playback progress, and displaying the bullet screen segment file corresponding to the current playback progress in the bullet screen display area.

When the playback progress bar of the target live playback video is dragged, the corresponding bullet screen in the video will also change. For example, when the playback progress bar of the target live playback video is dragged, the client 40 can query whether the bullet screen segment file corresponding to the current playback progress is cached in the memory. When the client 40 queries that there is a bullet screen segment file corresponding to the current playback progress in the memory, the client 40 can directly display the bullet screen segment file corresponding to the current playback progress in the bullet screen display area without requesting the corresponding bullet screen segment file from the server 20 again. When the client 40 queries that there is no bullet screen segment file corresponding to the current playback progress in the memory, the client 40 can generate a dragged bullet screen pull request according to the current playback progress, and send the dragged bullet screen pull request to the server, to cause the server to return the bullet screen segment file corresponding to the current playback progress, and display the bullet screen segment file corresponding to the current playback progress in the bullet screen display area. In the embodiment, the accuracy of the bullet screen pull request to pull the bullet screen segment file is improved by querying whether the bullet screen segment file corresponding to the current playback progress is cached in the memory and timely updating the bullet screen segment file in the memory.

In some embodiments, the client 40 can also adjust and control the playback speed of the target live playback video. Wherein, when the playback speed changes, the bullet screen playing speed can follow the playback speed. That is, when the playback speed is 2 times, the bullet screen playing speed is also adjusted to 2 times. Wherein, the bullet screen playing speed can be changed by controlling time interval of each bounce of the bullet screen. In addition, when the bullet screen playing speed is accelerated, a number of bullet screens read from the memory can also be increased.

Figure 15:
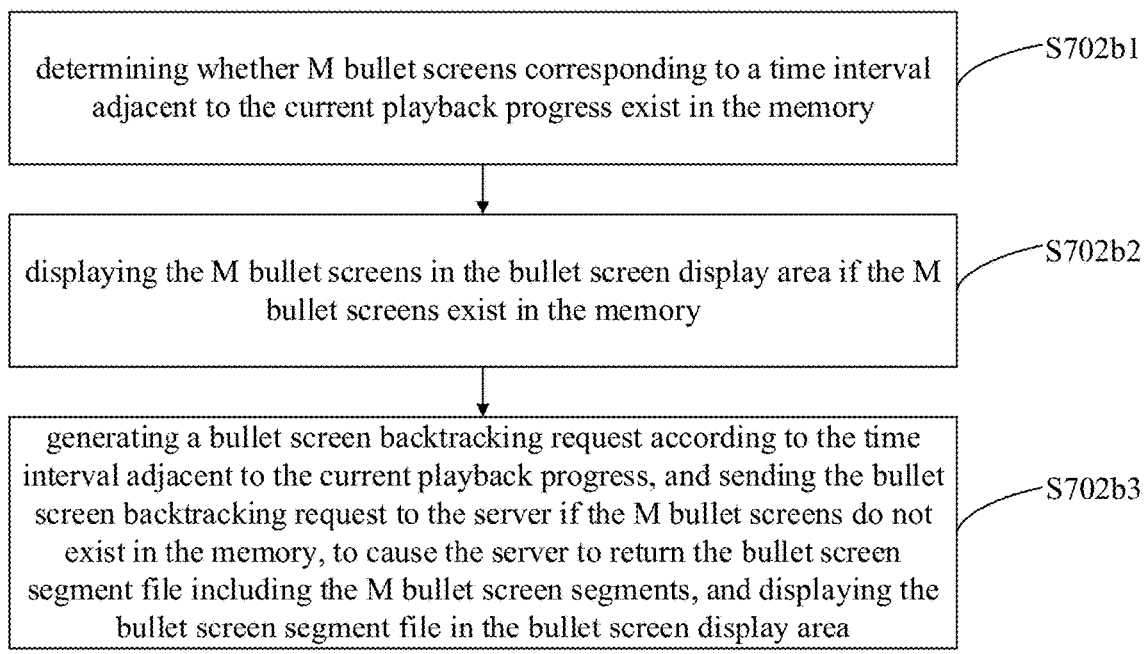
FIG. 15 schematically shows another specific flowchart of step S702 in FIG. 13.

As shown in FIG. 15, the step 702 can further comprise steps S702b1-S702b3, wherein: step S702b1, determining whether M bullet screens corresponding to a time interval adjacent to the current playback progress exist in the memory; step S702b2, displaying the M bullet screens in the bullet screen display area when the M bullet screens exist in the memory; step S702b3, generating a bullet screen backtracking request according to the time interval adjacent to the current playback progress, and sending the bullet screen backtracking request to the server when the M bullet screens do not exist in the memory, to cause the server to return the bullet screen segment file including the M bullet screen segments, and displaying the bullet screen segment file in the bullet screen display area.

In order to ensure that there is a bullet screen in the bullet screen display area, the client 40 can display the M bullet screen before the current playback progress in the bullet screen display area. For example, the client 40 can determine whether there are m bullet screens corresponding to the time interval adjacent to the current playback progress in the memory. When the M bullet screens exist in the memory, the client 40 can display the M bullet screens in the bullet screen display area. When the M bullet screens do not exist in the memory, the client 40 can generate the bullet screen backtracking request according to the time interval adjacent to the current playback progress, and send the bullet screen backtracking request to the server to cause the server to return the bullet screen segment file including the M bullet screens, and display the bullet screen partition file in the bullet screen display area. In the embodiment, the accuracy of the bullet screen pull request to pull the bullet screen segment file is improved by determining whether m bullet screens corresponding to the time interval adjacent to the current playback progress exist in the memory, and timely updating the bullet screen segment file in the memory.

In the exemplary embodiment, the live video bullet screen playback method further comprises the following steps: receiving real-time bullet screen data input by a target user, and displaying the real-time bullet screen data in the bullet screen display area.

For example, when the target live playback video is played back, the user can send real-time bullet screen data at the client 40, after receiving the real-time bullet screen data, the client 40 can perform the format conversion on the real-time bullet screen data, and display format converted real-time bullet screen data in the bullet screen display area. In addition, after receiving the real-time bullet screen data, the client 40 can send the real-time bullet screen data to the server 20 for storage, to increase a number of bullet screens of the target live playback video. In the embodiment, the diversity of bullet screen data in the target live playback video playback is improved by receiving the real-time bullet screen data input by the target user.

Figure 16:
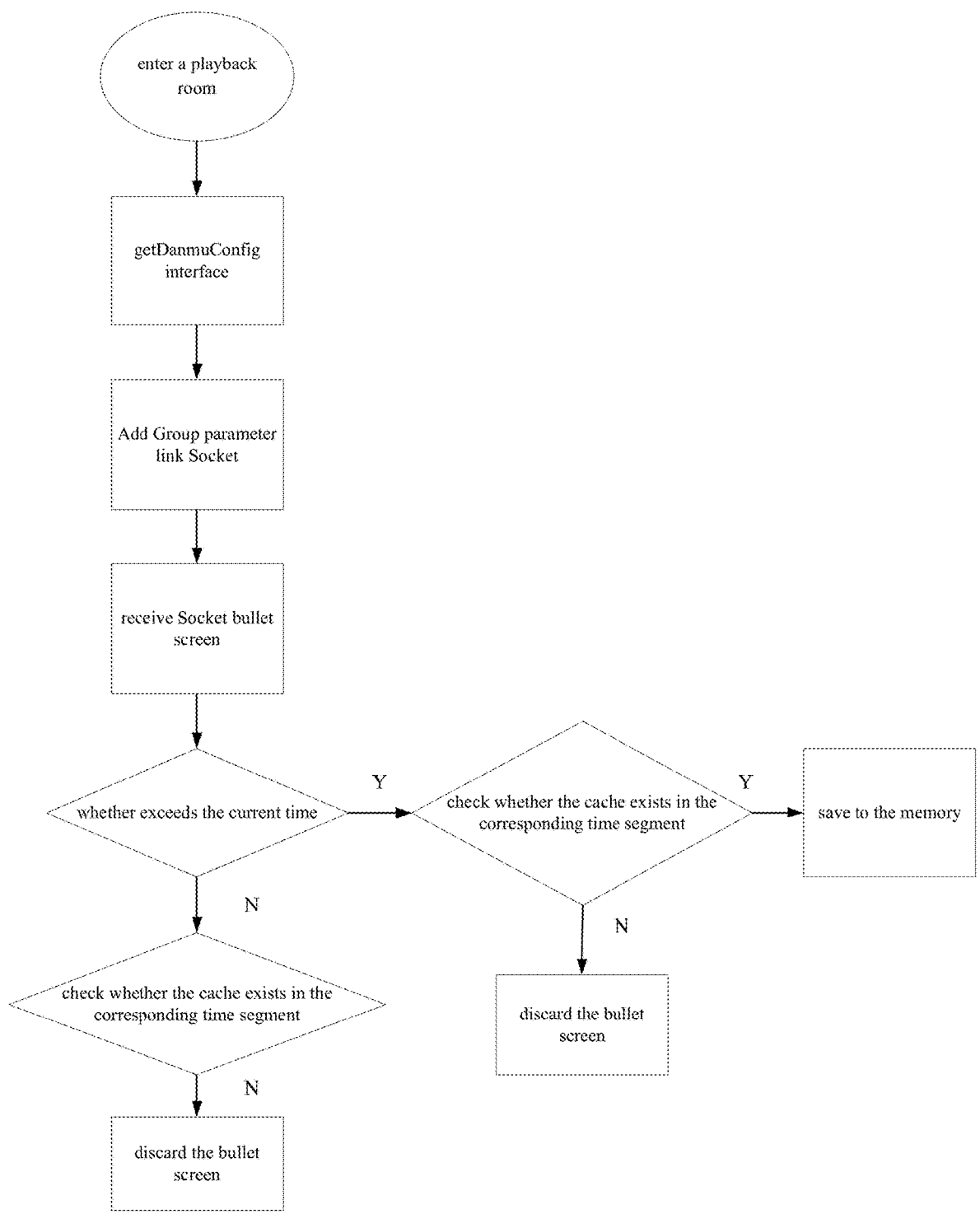
FIG. 16 schematically shows a flowchart of receiving a real-time bullet screen during video playback according to the fourth embodiment of the present application.

In order to facilitate understanding, as shown in FIG. 16, the embodiment also provides a flowchart of receiving real-time bullet screen during playback of video playback of the target live playback video.

After the target user enters the playback room of the live broadcast room, the client receives real-time bullet screens sent by other users when watching the playback of the target live playback video. In some embodiments, the client 40 may pre-create a "getdanmuconfing" interface for receiving user input information. The client 40 can receive the bullet screen information input by the users through the getdanmuconfing interface, and configure group parameter for the bullet screen information to generate corresponding real-time (Socket) bullet screen, and send the real-time bullet screen to the server 20 for storage.

In an exemplary embodiment, after the target user enters the playback room, the client 40 can check the bullet screen data in the memory at a certain time and frequency, clear overdue bullet screen data in time, and record information of the bullet screen data that is not overdue. The bullet screen data that is not overdue is the bullet screen data that has not been played in the memory. When the client 40 receives the real-time bullet screen, the client 40 can check whether a playing time point of the real-time bullet screen exceeds the playback progress of the target live playback video watched by the target user. When the playing time point of the real-time bullet screen exceeds the playback progress of the live playback video watched by the target user, whether there is corresponding cache data (bullet screen segment file) in the time segment of the real-time bullet screen can be checked. When there is corresponding cache data in the time segment of the real-time bullet screen, the real-time bullet screen can be saved to the memory. When there is no corresponding cache data in the time segment of the real-time bullet screen, the real-time bullet screen is discarded. When the playing time point of the real-time bullet screen does not exceed the playback progress of the target live playback video viewed by the target user, the real-time bullet screen is discarded.

Figure 17:
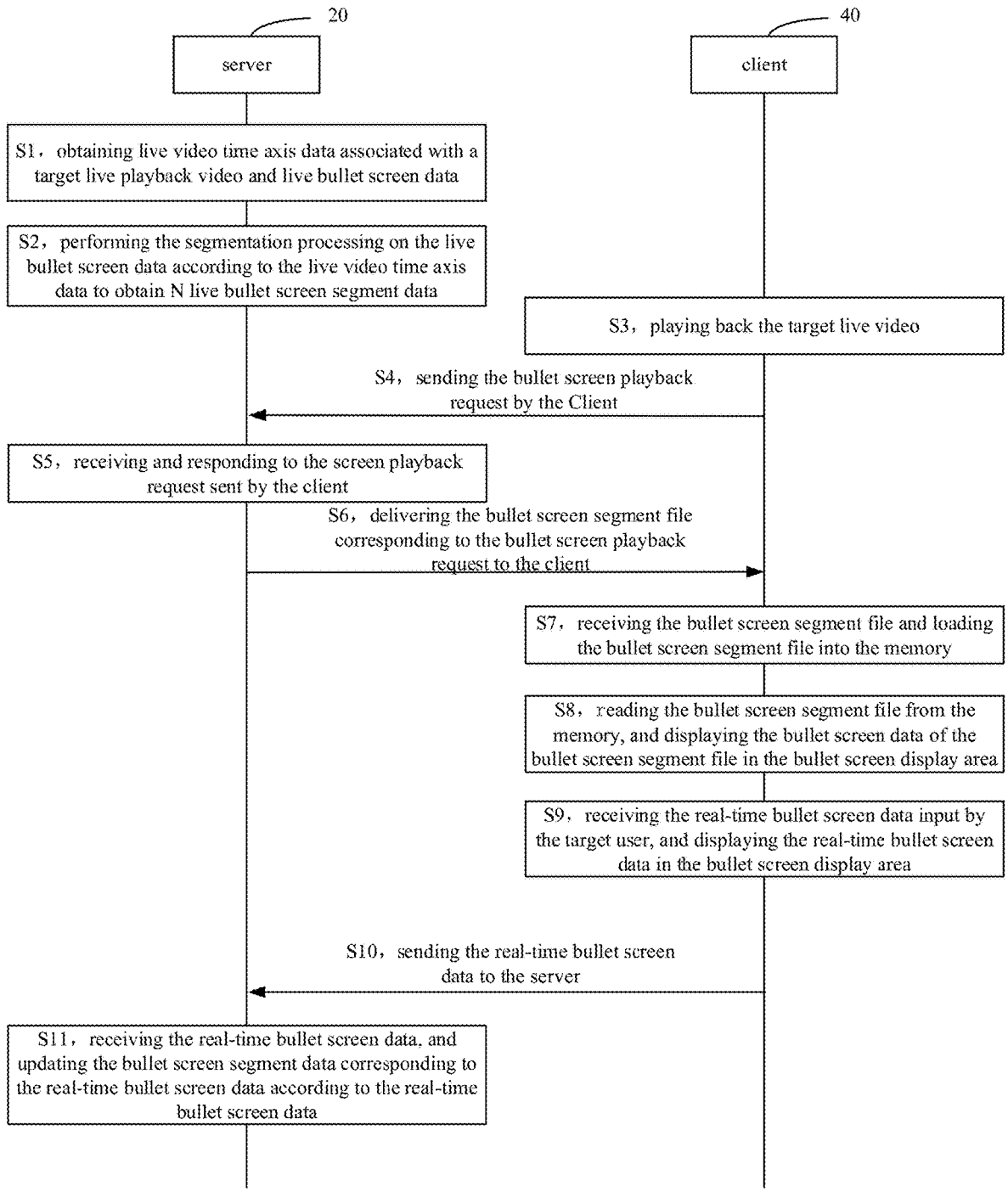
FIG. 17 schematically shows a flowchart of interaction between a server 20 and a client 40 in a live video bullet screen playback method according to the fourth embodiment of the present application.

In order to facilitate understanding, as shown in FIG. 17, the embodiment also provides an interaction flowchart among the server 20, the client 40, and a target platform 80.

As shown in FIG. 17, the interaction between the server 20 and the client 40 of the live video bullet screen playback method can comprise steps S1 to S7, wherein: step S1, obtaining live video time axis data associated with a target live playback video and live bullet screen data; step S2, performing a segmentation processing on the live bullet screen data according to the live video time axis data to obtain N live bullet screen segment data; step S3, playing back the target live video; step S4, sending a bullet screen playback request by the client; step S5, receiving and responding to the screen playback request sent by the client; step S6, delivering a bullet screen segment file corresponding to the bullet screen playback request to the client; step S7, receiving the bullet screen segment file and loading the bullet screen segment file into the memory; step S8, reading the bullet screen segment file from the memory, and displaying the bullet screen data of the bullet screen segment file in the bullet screen display area; step S9, receiving real-time bullet screen data input by the target user, and displaying the real-time bullet screen data in the bullet screen display area; step S10, sending the real-time bullet screen data to the server; and step S11, receiving the real-time bullet screen data, and updating the bullet screen segment data corresponding to the real-time bullet screen data according to the real-time bullet screen data.

Figure 18:
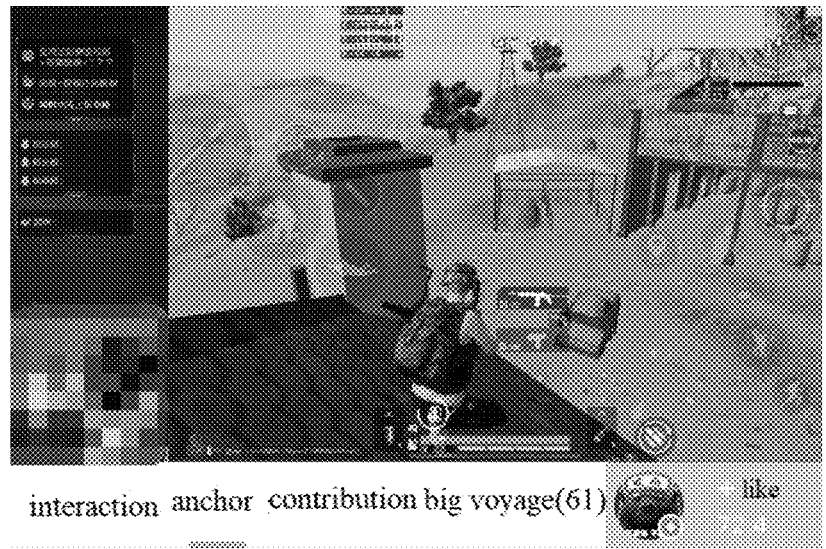
FIG. 18 schematically shows an interface diagram of a live steaming playback entrance of a client according to the fourth embodiment of the present application.
Figure 18:
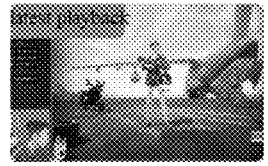
Figure 18:
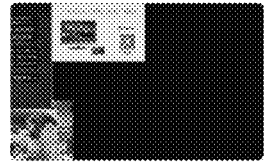
Figure 18:
Figure 19:
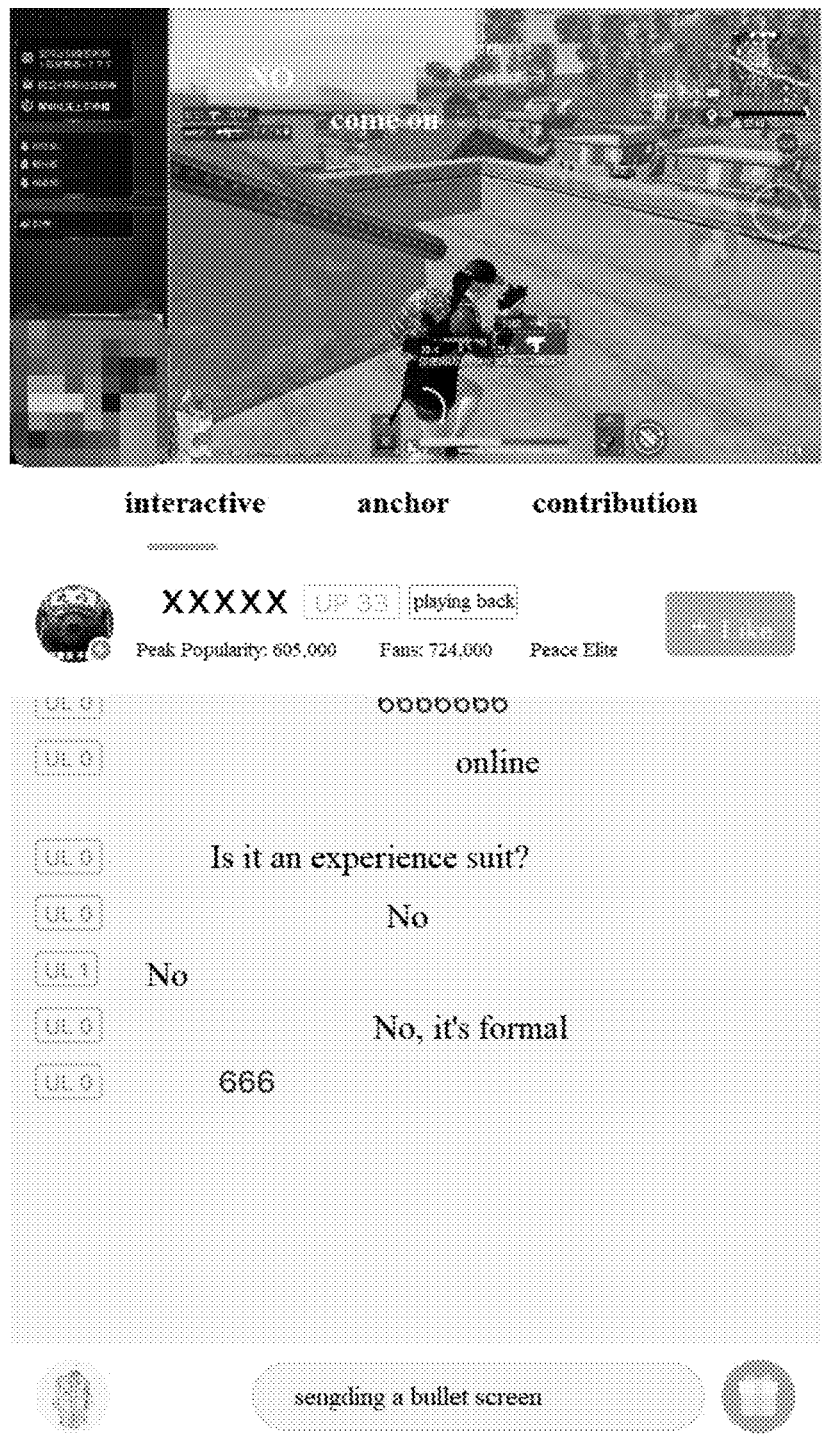
FIG. 19 schematically shows a live steaming playback interface diagram of a client according to the fourth embodiment of the present application.
Figure 20:
FIG. 20 schematically shows a full-screen view of a live broadcast playback of a client according to the fourth embodiment of the present application.

In order to facilitate understanding, the embodiment also provides FIGS. 18, 19, and 20, wherein, FIG. 18 is a live playback entrance interface diagram of the client 40, FIG. 19 is a live playback interface diagram of the client 40, and FIG. 20 is a live playback full-screen diagram of the client 40.

As shown in FIG. 18, the target user can enter the live playback interface of FIG. 19 by clicking the "live playback" button in FIG. 18. FIG. 20 is a full-screen state of FIG. 19.

Embodiment 5

Figure 21:
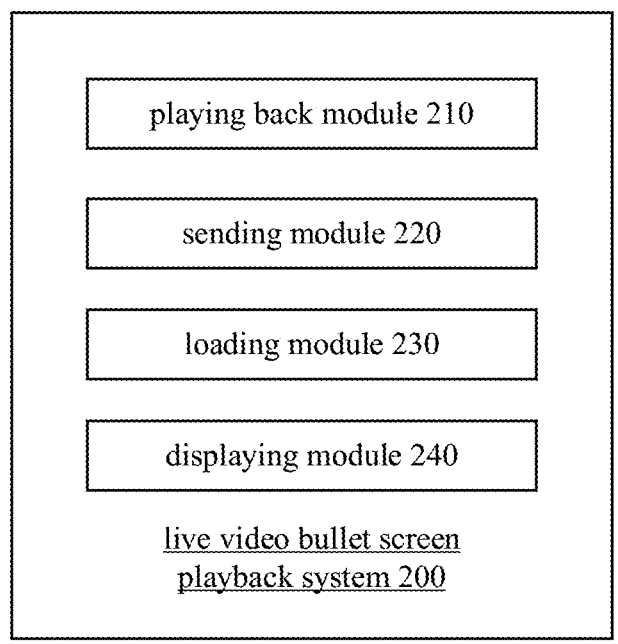
FIG. 21 schematically shows a block diagram of a live video bullet screen playback system according to a fifth embodiment of the present application.

FIG. 21 schematically shows a block diagram of a live video bullet screen playback system according to a fifth embodiment of the present application, and the live video bullet screen playback system may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 21, the live video bullet screen playback system 200 can comprise a playing back module 210, a sending module 220, a loading module 230, a displaying module 240, wherein:

The playing back module 210, playing back a target live playback video.

The sending module 220, sending a bullet screen request associated with the target live playback video to a server, to cause the server to return a corresponding bullet screen segment file according to the bullet screen request.

Exemplary, the bullet screen request comprises a target bullet screen playback request, and the target bullet screen playback request is configured to obtain an initial bullet screen segment file; the sending module 220, further sending the target bullet screen playback request to the server, to cause the server to return the initial bullet screen segment file according to the target bullet screen playback request.

Exemplary, the bullet screen request comprises a bullet screen pull request carrying a timestamp, and the sending module 220, further sending the bullet screen pull request to the server, to cause the server to return a bullet screen segment file corresponding to the timestamp according to the bullet screen pull request.

The loading module 230, receiving the bullet screen segment file, and loading the bullet screen segment file into a memory.

Exemplary, the bullet screen display area comprises an interactive bullet screen area and a text bullet screen area; the sending module 220, further analyzing the bullet screen segment file to obtain bullet screen analysis data; performing a classification operation on the bullet screen analysis data to obtain interactive bullet screen analysis data and text bullet screen analysis data; loading the interactive bullet screen analysis data and the text bullet screen analysis data into the memory.

The displaying module 240, reading the bullet screen segment file from the memory, and displaying bullet screen data of the bullet screen segment file in a bullet screen display area.

Exemplary, the displaying module 240, further reading the interactive bullet screen analysis data and the text bullet screen analysis data from the memory; displaying the interactive bullet screen analysis data in the interactive bullet screen area; and displaying the text bullet screen analysis data in the text bullet screen area.

Exemplary, the displaying module 240, obtaining a current playback progress of the target live playback video; determining current interactive bullet screen analysis data corresponding to the current playback progress; rendering the current interactive bullet screen analysis data to obtain rendered current interactive bullet screen analysis data; and displaying the rendered current interactive bullet screen analysis data in the interactive bullet screen area.

Exemplary, the live video bullet screen playback system 200 further comprise a pulling module, the pulling module, obtaining a playback progress of the target live playback video; determining whether the playback progress reaches a next time node adjacent to a previous time node; and generating a bullet screen pull request carrying a corresponding timestamp according to the playback progress when the playback progress reaches the next time node.

Exemplary, the pulling module, further querying whether a bullet screen segment file corresponding to a current playback progress is cached in the memory; displaying the bullet screen segment file corresponding to the current playback progress in the bullet screen display area when the bullet screen segment file corresponding to the current playback progress exists in the memory; and generating a dragged bullet screen pull request according to the current playback progress when the bullet screen segment file corresponding to the current playback progress does not exist in the memory; sending the dragged bullet screen pull request to the server, to cause the server to return the bullet screen segment file corresponding to the current playback progress, and displaying the bullet screen segment file corresponding to the current playback progress in the bullet screen display area.

Exemplary, the pulling module, further determining whether M bullet screens corresponding to a time interval adjacent to the current playback progress exist in the memory; displaying the M bullet screens in the bullet screen display area when the M bullet screens exist in the memory; and generating a bullet screen backtracking request according to the time interval adjacent to the current playback progress, and sending the bullet screen backtracking request to the server when the M bullet screens do not exist in the memory, to cause the server to return the bullet screen segment file including the M bullet screen segments, and displaying the bullet screen segment file in the bullet screen display area.

Exemplary, the live video bullet screen playback system 200 further comprises a receiving module, and the receiving module, receiving real-time bullet screen data input by a target user, and displaying the real-time bullet screen data in the bullet screen display area.

Embodiment 6

Figure 22:
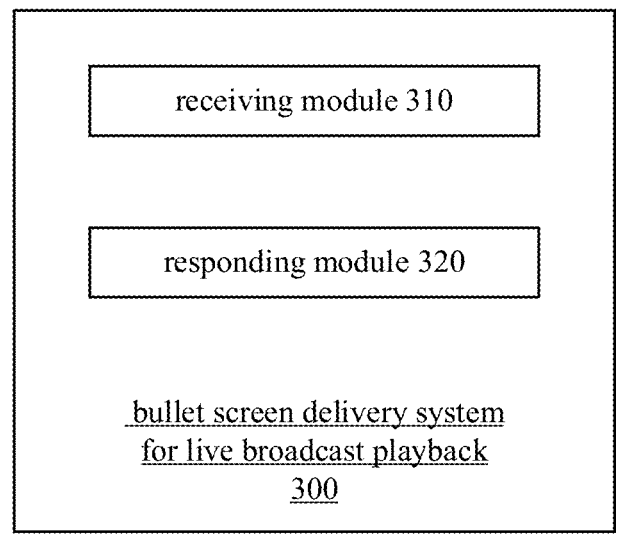
FIG. 22 schematically shows a block diagram of a bullet screen delivery system for live broadcast playback according to a sixth embodiment of the present application.

FIG. 22 schematically shows a block diagram of a bullet screen delivery system for live playback according to a sixth embodiment of the present application. The bullet screen delivery system for live playback may be divided into one or more program modules, which are stored in a medium, and executed by one or more processors to implement the embodiment of the present application. The program module referred to in the embodiment of the present application refers to a series of computer program instruction segments capable of accomplishing specific functions. The following description will specifically describe the functions of the program modules of the embodiment.

As shown in FIG. 22, the bullet screen delivery system for live broadcast playback 300 can comprise a receiving module 310 and a responding module 320, wherein:

The receiving module 310, receiving a bullet screen pull request sent by a client during live broadcast playback, the bullet screen pull request carrying a timestamp.

Exemplary, the timestamp is a sum of a preset time interval and a playback progress of the target live playback video during playback process.

Exemplary, the receiving module 310, further determining whether the timestamp carried in the bullet screen pull request is equal to a sum of a timestamp carried in a last bullet screen pull request and preset segment time; and determining the bullet screen pull request is a bullet screen pull request after a drag event of a playback progress bar occurs when the timestamp carried in the bullet screen pull request is not equal to the sum of the timestamp carried in the last bullet screen pull request and the preset segment time.

Exemplary, the receiving module 310, further obtaining a bullet screen segment file corresponding to the playback progress according to the playback progress of the target live playback video carried in the bullet screen pull request; and delivering the bullet screen segment file corresponding to the playback progress to the client.

The responding module 320, in response to the bullet screen pull request, delivering a bullet screen segment file corresponding to the timestamp in N bullet screen segment files to the client; wherein the N bullet screen segment files are obtained by segmenting live bullet screen data corresponding to a target live playback video, and the N is a positive integer.

Exemplary, the bullet screen delivery system for live playback 300 further comprises a generating module, and the generating module, obtaining live video time axis data associated with the target live playback video and the live bullet screen data; performing a segmentation processing on the live bullet screen data according to the live video time axis data to generate N live bullet screen segment data; binding the N live bullet screen segment data and the live video time axis data to obtain bound N live bullet screen segment data; and performing a format conversion on the bound N live bullet screen segment data to obtain the N bullet screen segment files.

Exemplary, the generating module, further determining a total duration of the target live video playback according to the live video time axis data; and performing the segmentation processing on the live bullet screen data according to the total duration of the target live video playback and preset segment time to obtain the N live bullet screen segment data.

Exemplary, the bullet screen delivery system for live playback 300 further comprises a saving module, and the saving module, receiving real-time bullet screen data sent by the client or other clients in a process of playing back the target live playback video, wherein the real-time bullet screen data comprise real-time bullet screen time data and real-time bullet screen content data corresponding to the live video time axis data; determining a target bullet screen segment file corresponding to the real-time bullet screen content data from the N bullet screen segment files according to the real-time bullet screen time data; updating the target bullet screen segment file according to the real-time bullet screen time data and real-time bullet screen content data to obtain an updated target bullet screen segment file; and saving the updated target bullet screen segment file to a database.

Embodiment 7

Figure 23:
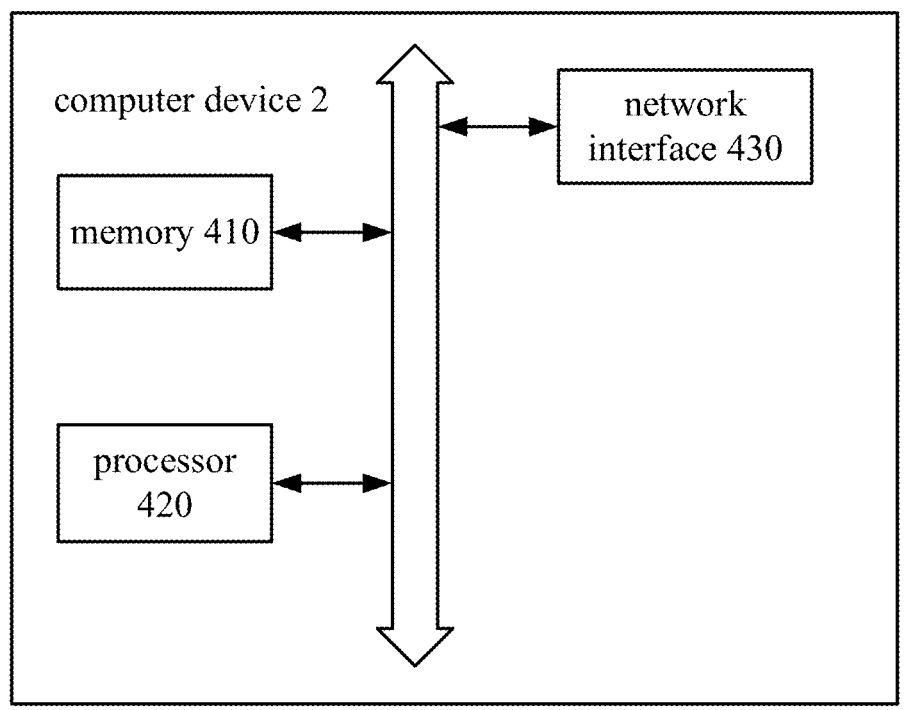
FIG. 23 schematically shows a schematic diagram of the hardware architecture of a computer device suitable for implementing the bullet screen delivery method for live broadcast playback according to a seventh embodiment of the present application.

FIG. 23 schematically shows a schematic diagram of the hardware architecture of a computer device suitable for implementing the bullet screen delivery method for live broadcast playback according to a seventh embodiment of the present application. A computer device 2 is applicable to the client 40 and the server 20 in the first and second embodiments. In the embodiment, the computer device 2 is a device capable of automatically performing numerical calculations and/or information processing according to predefined or stored instructions. For example, it can be a mobile device, a tablet device, a laptop computer, a game device, a set-top box, a digital streaming device, a smart TV, a TV box, a rack server, a blade server, a tower server, or a cabinet server (including independent servers, or server clusters composed of multiple servers), etc. As shown in FIG. 23, the computer device 2 includes, but is not limited to, a memory 410, a processor 420, and a network interface 430 that can be communicated with each other through a system bus. Of which:

The memory 410 includes at least one type of computer-readable storage medium. The readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 410 may be an internal storage module of the computer device 2 such as a hard disk or memory of the computer device 2. In other embodiments, the memory 410 may also be an external storage device of the computer device 2, such as a plugged hard disk provided on the computer device 2, a smart media card (SMC), secure digital (SD) card, a flash memory card, and the like. Of course, the memory 410 may also include both an internal storage module and an external storage device of the computer device 2. In the embodiment, the memory 410 is generally configured to store an operating system and various types of application software installed in the computer device 2 such as program codes of the network communication method and the like. In addition, the memory 410 may also be configured to temporarily store various types of data that have been or will be outputted.

The processor 420, in some embodiments, may be a central processing unit (CPU), a controller, a microprocessor, or other data processing chip. The processor 420 is generally configured to control the overall operation of the computer device 2 such as performing control and processing related to data interaction or communication with the computer device 2. In the embodiment, the processor 420 is configured to run program code stored in the memory 410 or process data.

The network interface 430 may include a wireless network interface or a wired network interface which is generally used to establish a communication connection between the computer device 2 and other computer devices. For example, the network interface 430 is used for connecting the computer device 2 to an external terminal via a network and establishing a data transmission channel and a communication connection between the computer device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 23 shows only a computer device 2 having components 410-430, but it is understood that it is not required to implement all of the shown components and that more or fewer parts can be implemented in lieu thereof.

In the embodiment, an interactive method of bullet screen eggs stored in the memory 410 may be divided into one or more program modules and executed by one or more processors (processor 420 in the embodiment) to complete the present application.

Embodiment 8

The embodiment further provides a computer-readable storage medium, which stores computer programs, and when the computer programs are executed by a processor, the steps of a bullet screen delivery method for live broadcast playback in the embodiment are realized.

In the embodiment, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the computer-readable storage medium may be an internal storage module of the computer device such as a hard disk or memory of the computer device. In other embodiments, the memory may also be an external storage device of the computer device, such as a plugged hard disk provided on the computer device, a smart media card (SMC), a secure digital (SD) card, a flash memory card, and the like. Of course, the computer-readable storage medium may also include both an internal storage module and an external storage device of the computer device. In the embodiment, the computer-readable storage medium is generally used to store an operating system and various types of application software installed in the computer device such as program codes of the network communication method and the like. In addition, the memory may also be used to temporarily store various types of data that have been or will be outputted.

The bullet screen delivery techniques for live broadcast playback provided by the embodiments of the present application realize reproduction of user behavior data (various types of bullet screen data) during a live broadcast by segmenting the live bullet screen data corresponding to the target live playback video and delivering the bullet screen segment file to the client in a way of segmentation, and a memory occupation rate of bullet screen data is reduced, and a playback fluency of the live bullet screens is improved.

Apparently, it should be appreciated by those skilled in the art that each module or step described in the embodiment of the present application can be realized by a general-purpose and that the modules or steps may be integrated on a single computer device or distributed on a network consisting of a plurality of computer devices, optionally, the modules or steps may be realized by executable program codes so that the modules or steps can be stored in a storage device to be executed by a computer device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method of presenting bullet screens, comprising:
receiving a request for bullet screens sent from a client computing device during playback of at least one portion of a live broadcast video, wherein the bullet screens comprise comments moving across frames of the live broadcast video, the request comprises a timestamp, and the timestamp is associated with a playback progress of the at least one portion of the live broadcast video;
determining a bullet screen segment file among a plurality of bullet screen segment files based on the timestamp, wherein the plurality of bullet screen segment files are generated by segmenting live bullet screen data associated with the live broadcast video into N bullet screen segment files, and the N is a positive integer; and
transmitting the bullet screen segment file to the client computing device for display of the bullet screens, wherein the display of the bullet screens is implemented by:
loading the bullet screen segment file into a memory,
reading the bullet screen segment file from the memory,
displaying the bullet screens in a bullet screen display area based on the bullet screen segment file, and
updating the bullet screen display area based on a current playback progress after a drag event occurs.

2. The method of claim 1, wherein generating the plurality of bullet screen segment files further comprises:
obtaining data indicating a time axis of the live broadcast video and the live bullet screen data;

performing a segmentation processing on the live bullet screen data based on the data indicating the time axis to obtain N segments of live bullet screen data;

binding the N segments of live bullet screen data with the data indicating the time axis to obtain bound N segments of live bullet screen data; and generating the N bullet screen segment files by performing a format conversion on the bound N segments of live bullet screen data.

3. The method of claim 2, wherein the performing a segmentation processing on the live bullet screen data further comprises:

determining a total duration of the live broadcast video based on the data indicating the time axis; and performing the segmentation processing on the live bullet screen data based on the total duration of the live broadcast video and a predetermined time interval.

4. The method of claim 1, further comprising:

receiving real-time data sent from the client computing device or other client computing devices, wherein the real-time data comprise real-time time data and comment data corresponding to the real-time time data, the real-time time data and the comment data associated with the time axis of the live broadcast video;

determining a target bullet screen segment file among the N bullet screen segment files based on the real-time time data;

updating the target bullet screen segment file based on the real-time time data and the comment data to obtain an updated target bullet screen segment file; and storing the updated target bullet screen segment file to a database.

5. The method of claim 1, further comprising:

determining whether the timestamp comprised in the request is equal to a sum of a timestamp comprised in an immediately previous request and a predetermined time interval; and determining that the request is sent after a drag event of a playback progress bar occurs based on determining that the timestamp comprised in the request is not equal to the sum of the timestamp comprised in the immediately previous request and the predetermined time interval.

6. A method of presenting bullet screens, comprising:

sending a request for bullet screens to a server computing device during playback of at least one portion of a live broadcast video, wherein the bullet screens comprise comments moving across frames of the live broadcast video, the request comprises a timestamp, and the timestamp is associated with a playback progress of the at least one portion of the live broadcast video;

receiving a bullet screen segment file among a plurality of bullet screen segment files, wherein the bullet screen segment file is determined based on the timestamp, the plurality of bullet screen segment files are generated by segmenting live bullet screen data associated with the live broadcast video into N bullet screen segment files, and the N is a positive integer;

loading the bullet screen segment file into a memory;

reading the bullet screen segment file from the memory;

displaying the bullet screens in a bullet screen display area based on the bullet screen segment file; and updating the bullet screen display area based on a current playback progress after a drag event occurs.

7. The method of claim 6, further comprising:

determining that the drag event occurs in a playback progress bar during the playback of the at least one portion of the live broadcast video.

8. The method of claim 6, wherein the updating the bullet screen display area further comprises:

querying whether a second bullet screen segment file corresponding to the current playback progress is cached in the memory;

displaying bullet screen data in the bullet screen display area based on the second bullet screen segment file when the second bullet screen segment file exists in the memory.

9. The method of claim 6, wherein the updating the bullet screen display area further comprises:

generating a second request based on the current playback progress in response to determining that the second bullet screen segment file does not exist in the memory;

sending the second request to the server computing device; and receiving the second bullet screen segment file from the server computing device for display of bullet screen data in the bullet screen display area based on the second bullet screen segment file.

10. The method of claim 6, wherein the updating the bullet screen display area further comprises:

determining whether a third bullet screen segment file corresponding to a time interval adjacent to the current playback progress exists in the memory; and displaying bullet screen data in the bullet screen display area based on the third bullet screen segment file when the third bullet screen segment area exists in the memory.

11. The method of claim 6, wherein the updating the bullet screen display area further comprises:

generating a third request based on the time interval adjacent to the current playback progress in response to determining that the third bullet screen segment file does not exist in the memory; and sending the third request to the server computing device; and receiving the third bullet screen segment file from the server computing device for display bullet screen data in the bullet screen display area based on the third bullet screen segment file.

12. The method of claim 6, wherein the bullet screen display area comprises a first area of displaying interactive bullet screens and a second area of displaying text bullet screens.

13. The method of claim 12, further comprising:

analyzing the bullet screen segment file to obtain bullet screen data;

performing a classification operation on the bullet screen data to obtain data indicating interactive bullet screens and data indicating text bullet screens; and loading the data indicating the interactive bullet screens and the data indicating text bullet screens into the memory;

reading the data indicating the interactive bullet screens and the data indicating the text bullet screens from the memory;

displaying the interactive bullet screens in the first area; and displaying the text bullet screens in the second area.

14. The method of claim 13,
wherein the displaying the interactive bullet screens in the first area further comprises:
obtaining a current playback progress of the at least one portion of the live broadcast video,
determining current interactive bullet screens based on the current playback progress,
rendering and displaying the current interactive bullet screens in the first area; and
wherein the displaying the text bullet screens in the second area further comprises:
obtaining the current playback progress of the at least one portion of the live broadcast video,
determining current text bullet screens based on the current playback progress, and
rendering and displaying the current text bullet screens in the second area.

15. The method of claim 6, further comprising:
receiving real-time bullet screen data input by a target user; and
displaying the real-time bullet screen data in the bullet screen display area.

16. A system, comprising:
at least one processor; and
at least one memory communicatively coupled to the at least one processor and comprising computer-readable instructions that upon execution by the at least one processor cause the at least one processor to perform operations comprising:
receiving a request for bullet screens sent from a client computing device during playback of at least one portion of a live broadcast video, wherein the bullet screens comprise comments moving across frames of the live broadcast video, the request comprises a timestamp, and the timestamp is associated with a playback progress of the at least one portion of the live broadcast video;
determining a bullet screen segment file among a plurality of bullet screen segment files based on the timestamp, wherein the plurality of bullet screen segment files are generated by segmenting live bullet screen data associated with the live broadcast video into N bullet screen segment files, and the N is a positive integer; and
transmitting the bullet screen segment file to the client computing device for display of the bullet screens, wherein the display of the bullet screens is implemented by:
loading the bullet screen segment file into a memory,
reading the bullet screen segment file from the memory,
displaying the bullet screens in a bullet screen display area based on the bullet screen segment file, and
updating the bullet screen display area based on a current playback progress after a drag event occurs.

17. The system of claim 16, wherein generating the plurality of bullet screen segment files further comprises:
obtaining data indicating a time axis of the live broadcast video and the live bullet screen data;
performing a segmentation processing on the live bullet screen data based on the data indicating the time axis to obtain N segments of live bullet screen data;
binding the N segments of live bullet screen data with the data indicating the time axis to obtain bound N segments of live bullet screen data; and
generating the N bullet screen segment files by performing a format conversion on the bound N segments of live bullet screen data.

18. The system of claim 17, wherein the performing a segmentation processing on the live bullet screen data further comprises:
determining a total duration of the live broadcast video based on the data indicating the time axis; and
performing the segmentation processing on the live bullet screen data based on the total duration of the live broadcast video and a predetermined time interval.

19. The system of claim 16, the operations further comprising:
receiving real-time data sent from the client computing device or other client computing devices, wherein the real-time data comprise real-time time data and comment data corresponding to the real-time time data, the real-time time data and the comment data associated with the time axis of the live broadcast video;
determining a target bullet screen segment file among the N bullet screen segment files based on the real-time time data;
updating the target bullet screen segment file based on the real-time time data and the comment data to obtain an updated target bullet screen segment file; and
storing the updated target bullet screen segment file to a database.

20. The system of claim 16, the operations further comprising:
determining whether the timestamp comprised in the request is equal to a sum of a timestamp comprised in an immediately previous request and a predetermined time interval; and
determining that the request is sent after a drag event of a playback progress bar occurs based on determining that the timestamp comprised in the request is not equal to the sum of the timestamp comprised in the immediately previous request and the predetermined time interval.

* * * * *